US012726986B2

(12) United States Patent
Zhao

(10) Patent No.: US 12,726,986 B2
(45) Date of Patent: Sep. 1, 2026

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventor: Nande Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 408 days.

(21) Appl. No.: 18/503,552

(22) Filed: Nov. 7, 2023

(65) Prior Publication Data

US 2024/0073910 A1 Feb. 29, 2024

Related U.S. Application Data

(63) Continuation of application No. PCT/CN2021/098322, filed on Jun. 4, 2021.

(51) Int. Cl.
*H04W 72/21* (2023.01)
*H04L 5/00* (2006.01)
*H04W 72/0457* (2023.01)

(52) U.S. Cl.
CPC .......... *H04W 72/21* (2023.01); *H04L 5/0012* (2013.01); *H04W 72/0457* (2023.01)

(58) Field of Classification Search
CPC .. H04W 72/21; H04W 72/0457; H04L 5/0012
See application file for complete search history.

(56) References Cited

U.S. PATENT DOCUMENTS

2012/0320862 A1* 12/2012 Ko .................... H04B 7/063 370/329
2018/0192420 A1 7/2018 Hao et al.
2019/0158334 A1 5/2019 Kim et al.

FOREIGN PATENT DOCUMENTS

CN 109600206 4/2019
CN 110034903 7/2019
CN 111418244 7/2020
CN 112640562 4/2021
WO 2020226406 11/2020

OTHER PUBLICATIONS

Vivo, "Discussions on PUCCH enhancements for NR operation from 52.6GHz to 71GHz," 3GPP TSG RAN WG1 #104-e, R1-2100431, Jan. 2021.
EPO, Extended European Search Report for EP Application No. 21943573.2, May 6, 2024.

(Continued)

*Primary Examiner* — Brenda H Pham
(74) *Attorney, Agent, or Firm* — Hodgson Russ LLP

(57) ABSTRACT

A wireless communication method and a terminal device are provided. The method includes the following. A terminal device determines a target physical uplink control channel (PUCCH) resource corresponding to a PUCCH, where the PUCCH resource includes at least one resource element (RE) in each of physical resource blocks (PRBs) of a target PRB-number, and the target PRB-number is a positive integer greater than or equal to 1. The terminal device transmits the PUCCH on the target PUCCH resource.

18 Claims, 10 Drawing Sheets

(56) References Cited

OTHER PUBLICATIONS

"3rd Generation Partnership Project; Technical Specification Group Radio Access Network; NR; Physical layer procedures for control (Release 16)," 3GPP TS 38.213, Mar. 2021, v16.5.0.
"Broadband Radio Access Networks (BRAN); 60 GHz Multiple-Gigabit WAS/RLAN Systems; Harmonized EN covering the essential requirements of article 3.2 of the R&TTE Directive," ETSI EN 302 567, Jan. 2012, v1.2.1.
Vivo, "Discussions on PUCCH enhancements for NR operation from 52.6GHz to 71GHz," 3GPP TSG RAN WG1 #105-e, R1-2104349, May 2021.
Ericsson, "Enhancements for PUCCH formats 0/1/4," 3GPP TSG-RAN WG1 Meeting #105-e, Tdoc R1-2104461, May 2021.
Catt, "Enhancements for PUCCH formats for up to 71GHz operation," 3GPP TSG RAN WG1 Meeting #105-e, R1-2104508, May 2021.
Qualcomm Incorporated, "Enhancement for PUCCH format 0/1/4 for NR operations in unlicensed 60GHz band," 3GPP TSG-RAN WG1 #105e, R1-2104660, May 2021.
NTT Docomo, Inc., "Pucch format 0/1/4 enhancements for NR from 52.6 to 71 Ghz," 3GPP TSG RAN WG1 Meeting #105-e, R1-2105689, May 2021.
Oppo, "Discussion on enhancements for PUCCH format 0/1/4," 3GPP TSG RAN WG1 #105-e, R1-2104766, May 2021.
Ericsson, "FL Summary 2 for [105-e-NR-52-71GHz-02] Email discussion/approval," 3GPP TSG-RAN WG1 Meeting #105-e, R1-2106288, May 2021.
Vivo, "Discussions on PUCCH enhancements for NR operation from 52.6GHz to 71GHz," 3GPP TSG RAN WG1 #105-e, R1-2106065, May 2021.
WIPO, International Search Report and Written Opinion for International Application No. PCT/CN2021/098322, Feb. 25, 2022.
Motorola Mobility et al., "PUCCH resource allocation," 3GPP TSG RAN WG1 #91, R1-1720926, Nov. 2017.
EPO, Communication for EP Application No. 21943573.2, Apr. 3, 2025.
EPO, Examination Report for EP Application No. 21943573.2, Nov. 11, 2024.

* cited by examiner

WIRELESS COMMUNICATION METHOD AND TERMINAL DEVICE

CROSS-REFERENCE TO RELATED APPLICATION(S)

This application is a continuation of International Application No. PCT/CN2021/098322, filed Jun. 4, 2021, the entire disclosure of which is incorporated herein by reference.

TECHNICAL FIELD

Embodiments of the disclosure relate to the field of communication, and more particularly, to a wireless communication method and a terminal device.

BACKGROUND

In uplink (UL) transmission, there are usually limitations imposed on a maximum power spectral density (PSD) and a maximum equivalent isotropic radiated power (EIRP) in regulations. In addition, physical uplink control channel (PUCCH) format 0/1/4 only supports transmission on one physical resource block (PRB), which results in limitation of coverage performance of PUCCH transmission.

In some implementations, consider to increase a configurable number (that is, quantity) of PRBs for PUCCH transmission under regulatory limitations. In this case, how to implement PUCCH transmission on these PRBs to improve coverage performance of transmission is a problem to be solved.

SUMMARY

In a first aspect, a wireless communication method is provided. The method includes the following. A terminal device determines a target physical uplink control channel (PUCCH) resource corresponding to a PUCCH, where the PUCCH resource includes at least one resource element (RE) in each of PRBs of a target PRB-number, and the target PRB-number is a positive integer greater than or equal to 1. The terminal device transmits the PUCCH on the target PUCCH resource.

In a second aspect, a wireless communication method is provided. The method includes the following. A network device sends indication information to a first terminal device, where the indication information is used for the first terminal device to determine a target PUCCH resource used for transmitting a PUCCH, the PUCCH resource includes at least one RE in each of PRBs of a target PRB-number, and the target PRB-number is a positive integer greater than or equal to 1.

In a third aspect, a terminal device is provided. The terminal device includes a transceiver, a processor and a memory. The memory is configured to store computer programs. The processor is configured to invoke and execute the computer programs stored in the memory, to perform the method described in the first aspect or in various implementations of the first aspect.

DETAILED DESCRIPTION

Figure 1:
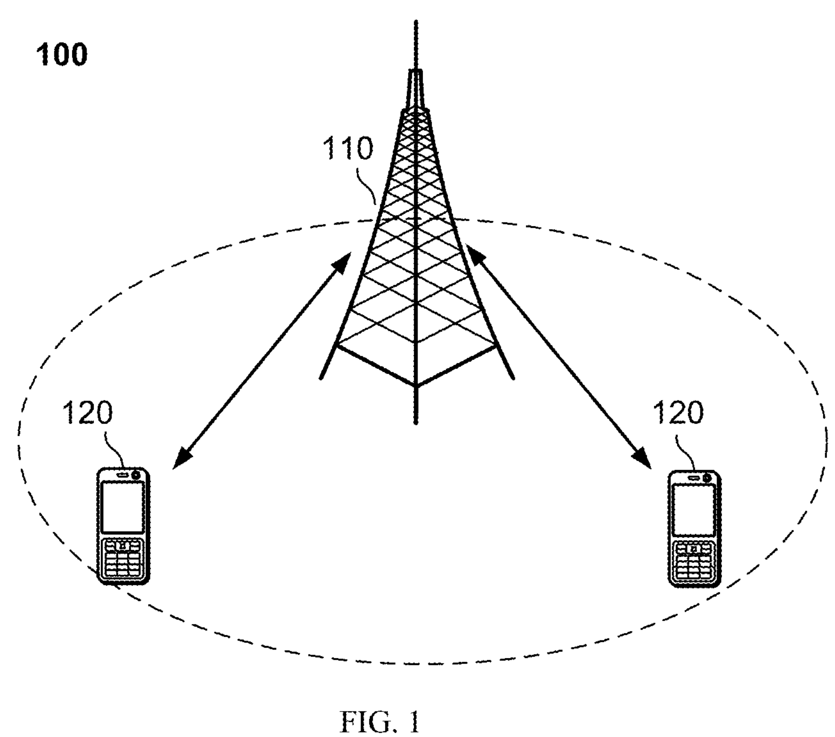
FIG. 1 is a schematic architectural diagram of a communication system provided in embodiments of the disclosure.

The following will describe technical solutions of embodiments of the disclosure with reference to the accompanying drawings in embodiments of the disclosure. Apparently, embodiments described herein are merely some embodiments, rather than all embodiments, of the disclosure. Based on the embodiments of the disclosure, all other embodiments obtained by those of ordinary skill in the art without creative effort shall fall within the protection scope of the disclosure.

The technical solutions of embodiments of the disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (WiFi), a $5^{th}$-generation (5G) communication system, or other communication systems, etc.

Generally speaking, a conventional communication system generally supports a limited quantity of connections and therefore is easy to implement. However, with development of communication technology, a mobile communication system will not only support conventional communication but also support, for example, device to device (D2D) communication, machine to machine (M2M) communication, machine type communication (MTC), vehicle to vehicle (V2V) communication, or vehicle to everything (V2X) communication, etc. Embodiments of the disclosure can also be applied to these communication systems.

Optionally, the communication system in embodiments of the disclosure may be applied to a carrier aggregation (CA) scenario, or may be applied to a dual connectivity (DC) scenario, or may be applied to a standalone (SA) network deployment scenario.

Optionally, the communication system in embodiments of the disclosure is applicable to an unlicensed spectrum, and an unlicensed spectrum may be regarded as a shared spectrum. Or the communication system in embodiments of the disclosure is applicable to a licensed spectrum, and a licensed spectrum may be regarded as a non-shared spectrum.

Various embodiments of the disclosure are described in connection with a network device and a terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device, etc.

The terminal device may be a station (ST) in a WLAN, a cellular radio telephone, a cordless telephone, a session initiation protocol (SIP) telephone, a wireless local loop (WLL) station, a personal digital assistant (PDA), a handheld device or a computing device with wireless communication functions, other processing devices coupled with a wireless modem, an in-vehicle device, a wearable device, and a terminal device in a next-generation communication system, for example, a terminal device in an NR network, or a terminal device in a future evolved public land mobile network (PLMN), etc.

In embodiments of the disclosure, the terminal device may be deployed on land, which includes indoor or outdoor, handheld, wearable, or in-vehicle. The terminal device may also be deployed on water (such as ships, etc.). The terminal device may also be deployed in the air (such as airplanes, balloons, satellites, etc.).

In embodiments of the disclosure, the terminal device may be a mobile phone, a pad, a computer with wireless transceiver functions, a virtual reality (VR) terminal device, an augmented reality (AR) terminal device, a wireless terminal device in industrial control, a wireless terminal device in self driving, a wireless terminal device in remote medicine, a wireless terminal device in smart grid, a wireless terminal device in transportation safety, a wireless terminal device in smart city, or a wireless terminal device in smart home, etc.

By way of explanation rather than limitation, in embodiments of the disclosure, the terminal device may also be a wearable device. The wearable device may also be called a wearable smart device, which is a generic term of wearable devices obtained through intelligentization design and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

In embodiments of the disclosure, the network device may be a device configured to communicate with a mobile device, and the network device may be an access point (AP) in a WLAN, a base transceiver station (BTS) in GSM or CDMA, or may be a Node B (NB) in WCDMA, or may be an evolutional Node B (eNB or eNodeB) in LTE, or a relay station or AP, or an in-vehicle device, a wearable device, a network device (gNB) in an NR network, a network device in a future evolved PLMN, or a network device in an NTN, etc.

By way of explanation rather than limitation, in embodiments of the disclosure, the network device may be mobile. For example, the network device may be a mobile device. Optionally, the network device may be a satellite or a balloon base station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station deployed on land or water.

In embodiments of the disclosure, the network device serves a cell, and the terminal device communicates with the network device on a transmission resource (for example, a frequency-domain resource or a spectrum resource) for the cell. The cell may be a cell corresponding to the network device (for example, a base station). The cell may belong to a macro base station, or may belong to a base station corresponding to a small cell. The small cell may include: a metro cell, a micro cell, a pico cell, a femto cell, and the like. These small cells are characterized by small coverage and low transmission power and are adapted to provide data transmission service with high-rate.

Exemplarily, FIG. 1 illustrates a communication system 100 to which embodiments of the disclosure are applied. The communication system 100 may include a network device 110. The network device 110 may be a device for communicating with a terminal device 120 (also referred to as "communication terminal" or "terminal"). The network device 110 can provide a communication coverage for a specific geographical area and communicate with terminal devices in the coverage area.

FIG. 1 exemplarily illustrates one network device and two terminal devices. Optionally, the communication system 100 may also include multiple network devices, and there can be other quantities of terminal devices in a coverage area of each of the network devices. Embodiments of the disclosure are not limited in this regard.

Optionally, the communication system 100 may further include other network entities such as a network controller, a mobile management entity, or the like, and embodiments of the disclosure are not limited in this regard.

It should be understood that, in embodiments of the disclosure, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be elaborated again herein. The communication device may further include other devices such as a network controller, a mobile management entity, or other network entities in the communication system 100, and embodiments of the disclosure are not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

It should be understood that, "indication" referred to in embodiments of the disclosure may be a direct indication, may be an indirect indication, or may mean that there is an association relationship. For example, A indicates B may mean that A directly indicates B, for instance, B can be obtained according to A; may mean that A indirectly indicates B, for instance, A indicates C, and B can be obtained according to C; or may mean that that there is an association relationship between A and B.

In the elaboration of embodiments of the disclosure, the term "correspondence" may mean that there is a direct or indirect correspondence between the two, may mean that there is an association between the two, or may mean a relationship of indicating and indicated or configuring and configured, etc.

In embodiments of the disclosure, the "pre-defined" can be implemented by pre-saving a corresponding code or table in a device (for example, including the terminal device and the network device) or in other manners that can be used for indicating related information, and the disclosure is not limited in this regard. For example, the "pre-defined" may mean defined in a protocol.

In embodiments of the disclosure, the "protocol" may refer to a communication standard protocol, which may include, for example, an LTE protocol, an NR protocol, and a protocol applied to a future communication system, and the disclosure is not limited in this regard.

In order for better understanding of technical solutions of embodiments of the disclosure, the technical solutions of the disclosure will be described in detail below in connection with embodiments. The following related art as an optional scheme can be arbitrarily combined with the technical solutions of embodiments of the disclosure, which shall all belong to the protection scope of embodiments of the disclosure. Embodiments of the disclosure include at least some of the following.

In the related art, a scheme for determining a physical uplink control channel (PUCCH) resource set before radio resource control (RRC) connection establishment and after RRC connection establishment is specified in technical specification 38.213 (TS 38.213) section 9.2.1.

Before RRC connection establishment, a UE cannot obtain a PUCCH resource configuration via higher-layer RRC signaling. Therefore, in TS 38.213, 16 common PUCCH resource sets are pre-defined in an initial uplink (UL) bandwidth part (BWP) through row indexes shown in Table 1 below, that is, each PUCCH resource set corresponds to one row of the table.

TABLE 1

| Row index | PUCCH format | $1^{st}$ symbol | Number of symbols | Physical resource block (PRB) offset $RB_{BWP}^{offset}$ | Initial cyclic shift (CS) index set |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8 } |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

In multiple PUCCH resource sets pre-defined, each PUCCH resource set includes 16 PUCCH resources, where each PUCCH resource corresponds to a PUCCH format, a start symbol (namely, the $1^{st}$ symbol), the number of symbols, a PRB offset, and a CS in order for multi-user multiplexing.

After RRC connection establishment, the UE may obtain, via higher-layer signaling, one or more PUCCH resources configured by a network device, thereby performing PUCCH transmission.

In the related art, PUCCH format 0/1/4 only supports transmission on one PRB. There are usually some limitations imposed on UL transmission in regulations in order to avoid interference between UEs. For example, in an unlicensed band of 60 gigahertz (GHz), there are usually limitations imposed on a maximum power spectral density (PSD) and a maximum equivalent isotropic radiated power (EIRP) in regulations. In this case, it is hard to reach a maximum transmit power allowed by regulations by adopting a conventional power boosting scheme, which leads to limitation of coverage performance of PUCCH transmission.

In some implementations, consider to increase a configurable number (i. e. quantity) of PRBs (hereinafter, "configurable PRB-number" for short) for PUCCH transmission under PSD limitation. In this case, how to implement PUCCH transmission on these PRBs to improve coverage performance of UL transmission is a problem to be solved.

The disclosure provides a wireless communication method, a terminal device, and a network device, which can realize transmission on at least one physical resource block (PRB) by a terminal device.

Figure 2:
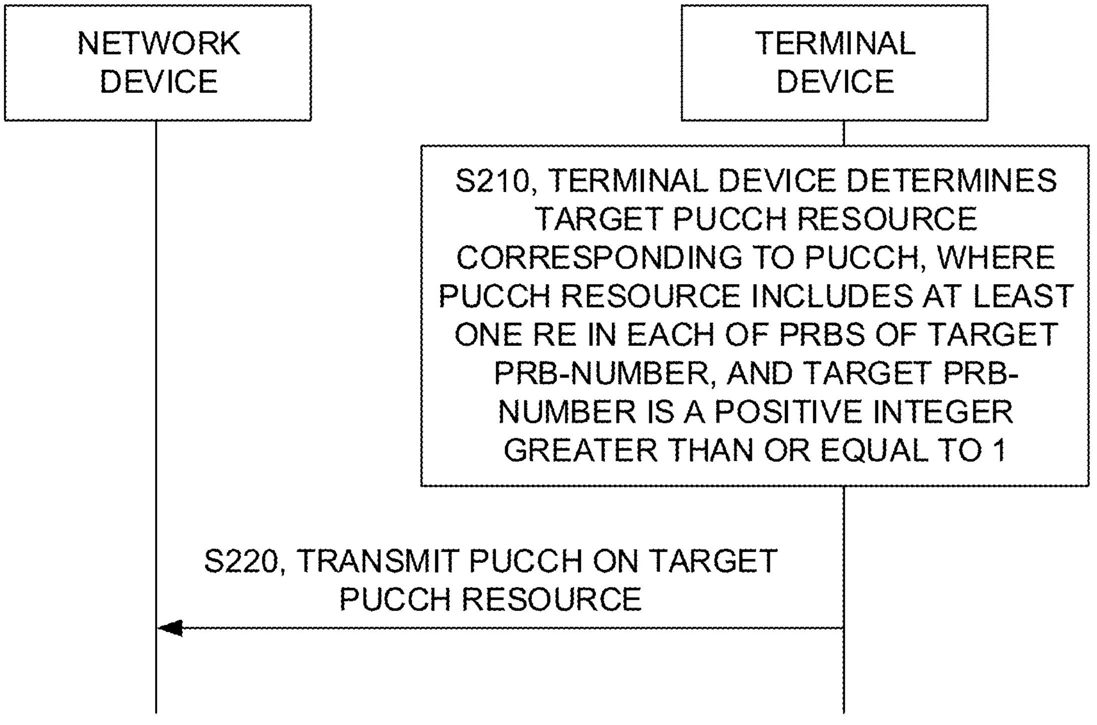
FIG. 2 is a schematic interaction diagram of a wireless communication method provided in embodiments of the disclosure.

FIG. 2 is a schematic flowchart of a wireless communication method 200 according to embodiments of the disclosure. The method 200 may be performed by the terminal device in the communication system illustrated in FIG. 1. As illustrated in FIG. 2, the method 200 includes the following.

S210, a terminal device determines a target PUCCH resource corresponding to a PUCCH, where the target PUCCH resource includes at least one resource element (RE) in each of PRBs of a target PRB-number (that is, a target number of PRBs), and the target PRB-number is a positive integer greater than or equal to 1.

S220, the terminal device transmits the PUCCH on the target PUCCH resource.

Accordingly, a network device receives the PUCCH transmitted by the terminal device on the target PUCCH resource.

It should be understood that, embodiments of the disclosure may be applied to determining a PUCCH resource in an unlicensed spectrum, or may be applied to determining a PUCCH resource in a licensed spectrum, and there is no limitation on the application scenario in the disclosure.

In embodiments of the disclosure, the terminal device may be a terminal device in a non-connection state, for example, an idle state or an inactive state; or may be a terminal device in a connected state. In other words, the PUCCH resource may be a PUCCH resource used by the terminal device in the non-connected state for PUCCH transmission, or may be a PUCCH resource used by the terminal device in the connected state for PUCCH transmission.

That is, the scheme for determining the target PUCCH resource corresponding to PUCCH transmission in embodiments of the disclosure may be applied to determining the target PUCCH resource corresponding to PUCCH transmission in initial access, or may be applied to determining the target PUCCH resource corresponding to PUCCH transmission in a connected mode.

In embodiments of the disclosure, the PUCCH may be of a first PUCCH format, where the first PUCCH format exemplarily may include, but is not limited to, PUCCH format 0, PUCCH format 1, and PUCCH format 4.

It should be noted that, in embodiments of the disclosure, for each PRB in the target PUCCH resource, the target PUCCH resource may occupy all REs in the PRB, or may occupy some REs in the PRB. In other words, the REs occupied by the target PUCCH resource may be distributed according to a certain comb (also referred to as "interlace") interval, where the comb interval may be 1 RE, 2 REs, or 12 REs, etc.

It should be understood that, in embodiments of the disclosure, if the target PRB-number is greater than 1, the PRBs of the target PRB-number may be multiple contiguous PRBs, or may be multiple non-contiguous PRBs, and the disclosure is not limited in this regard.

It should be noted that, "the PRBs of the target PRB-number are contiguous PRBs" may mean that PRBs occupied by the target PUCCH resource are contiguous, but REs occupied by the target PUCCH resource in the PRBs are however not necessarily contiguous, for example, may be distributed according to a certain comb interval, where the comb interval may be greater than 1 RE.

With the above technical solution, the terminal device can determine the target PUCCH resource corresponding to PUCCH transmission, where the target PUCCH resource includes at least one RE in at least one PRB. Further, the terminal device performs PUCCH transmission on the at least one RE in the at least one PRB, which is beneficial to improving coverage performance of uplink (UL) transmission.

The following will describe the scheme for determining the target PUCCH resource with reference to some embodiments.

Embodiment I

In some embodiments of the disclosure, S210 may be implemented as follows. The terminal device determines the target PRB-number $N_{RB}$ according to a preset rule and/or indication information from the network device.

For the convenience of differentiation and illustration, an upper limit of a PRB number (that is, an upper limit of a configurable PRB-number) for PUCCH transmission determined by the terminal device according to the preset rule is denoted as a first PRB-number (that is, a first number of PRBs).

In some embodiments, the preset rule may include a rule specified in a protocol, for example, some limitations specified in the protocol, where the limitations are used for limiting a maximum PRB-number for PUCCH transmission. In this case, the terminal device can determine the first PRB-number based on the limitations.

In other embodiments, the preset rule may include national regulatory requirements or usage regulations on spectrum, such as usage regulations on resources in an unlicensed spectrum. For example, in order to avoid strong interference to other systems using an unlicensed spectrum resource, there are usually limitations imposed on a maximum transmit power or a maximum transmit-power spectral density of a terminal device using an unlicensed spectrum resource. For instance, in European regulations, limitations regarding a maximum transmit power, a maximum PSD, and a maximum EIRP of a signal on an unlicensed spectrum are specified.

In some embodiments, the terminal device determines the target PRB-number according to the preset rule as follows. The terminal device determines the first PRB-number according to the preset rule. The terminal device determines the first PRB-number as a default target PRB-number.

For example, if the indication information is not received from the network device, the terminal device may use the default target PRB-number to perform PUCCH transmission. As an example, the terminal device in the non-connected state may take the default target PRB-number as the target PRB-number used for PUCCH transmission in initial access.

In some embodiments, the network device may also determine the first PRB-number according to the preset rule.

It should be understood that, the manner in which the network device determines the first PRB-number according to the preset rule is similar to the manner in which the terminal device determines the first PRB-number according to the preset rule. In the following elaborations, the first PRB-number is determined exemplarily by the network device according to the preset rule.

For example, the network device determines the first PRB-number according to the preset rule and a first subcarrier spacing.

Optionally, the first subcarrier spacing may be a predefined subcarrier spacing, or may be a subcarrier spacing indicated by the network device, or may be an initial subcarrier spacing, or may be a default subcarrier spacing.

For example, the first subcarrier spacing is 120 kilohertz (kHz), 480 kHz, 960 kHz, etc.

In some embodiments, the network device may determine, according to an upper limit of a PSD and an upper limit of an EIRP specified in regulations, a bandwidth where the upper limit of the PSD and the upper limit of the EIRP will be reached, thereby determining the first PRB-number according to the bandwidth and the first subcarrier spacing.

For example, the upper limit of the PSD and the upper limit of EIRP specified in the European regulations (i.e. EN302 567) are 23 decibels relative to one milliwatt (dBm)/megahertz (MHz) and 40 dBm respectively, that is, PSD=23 dBm/MHz, max(EIRP)=40 dBm. Accordingly, the bandwidth where the upper limit of the PSD and the upper limit of the EIRP will be reached is $$BW = 10^{(max(EPRP)-PSD/10} = 10^{(40-23)/10} = 50 \text{ MHz}.$$

If the first subcarrier spacing is 120 kHz, a PRB bandwidth is determined according to the first subcarrier spacing and the number $$N_{SC}^{RB}$$

of subcarriers in one PRB. For example, if the first subcarrier spacing is 120 kHz and the number of subcarriers in one PRB is 12, the PRB bandwidth is 120 kHz*12=1.44 MHz. In this case, the upper limit of the configurable PRB-number is $max(N_{RB})=\lfloor 50 \text{ MHz}/1.44 \text{ MHz} \rfloor=34$. Similarly, if the first subcarrier spacing is 480 kHz, the upper limit of the configurable PRB-number is 8; and if the first subcarrier spacing is 960 kHz, the upper limit of the configurable PRB-number is 4.

In some embodiments, the network device may take the upper limit $max(N_{RB})$ of the configurable PRB-number, which is calculated according to regulations and the first subcarrier spacing, as the first PRB-number; or may convert the upper limit $max(N_{RB})$ of the configurable PRB-number into a binary number not greater than $max(N_{RB})$ and take the binary number as the first PRB-number. For example, if the first subcarrier spacing is 120 kHz, the network device may take the upper limit (i.e. 34) of the configurable PRB-number as the first PRB-number, or may take 32 as the first PRB-number.

In some embodiments, the network device may determine the target PRB-number according to a first candidate PRB-number set (that is, a first set of candidate PRB-numbers).

In some embodiments, the first candidate PRB-number set may be pre-configured, i.e. pre-defined. For example, the first candidate PRB-number set may be pre-set or pre-stored in the network device.

In some embodiments, the first candidate PRB-number set is also pre-configured at the terminal device.

In some embodiments, the first candidate PRB-number set may be stored in the network device and the terminal device in a table or a list, and there is no limitation on the manner of storing the first candidate PRB-number set in the disclosure. In the following elaborations, the first candidate PRB-number set is stored exemplarily in a table, but the disclosure is not limited thereto.

In some embodiments, the first candidate PRB-number set is used for determining the target PRB-number used by the terminal device in the non-connected state for PUCCH transmission. In other words, the first candidate PRB-number set is used for determining the target PRB-number corresponding to PUCCH transmission in initial access.

In some embodiments, a candidate PRB-number in the first candidate PRB-number set is designed according to the first PRB-number.

For example, the first candidate PRB-number set includes at least one candidate PRB-number, where each of the at least one candidate PRB-number does not exceed the first PRB-number.

In some embodiments, each candidate PRB-number in the first candidate PRB-number set corresponds to one index. After determining the target PRB-number, the network device may indicate to the terminal device an index corresponding to the target PRB-number. Accordingly, the terminal device can consult a table corresponding to the first candidate PRB-number set according to the index, and take a candidate PRB-number corresponding to the index as the target PRB-number.

In some embodiments, a granularity of the candidate PRB-number in the first candidate PRB-number set is greater than or equal to 1 PRB.

In some embodiments, PRB-number differences between the candidate PRB-numbers in the first candidate PRB-number set are unequal, that is, the candidate PRB-numbers are unevenly distributed.

If the candidate PRB-number is small, increase of the candidate PRB-number will lead to substantial boosting of transmit power; and if the candidate PRB-number is large, increase of the candidate PRB-number will not lead to substantial boosting of transmit power, that is, if the candidate PRB-number continues increasing after the candidate PRB-number has been increased to a certain number, boosting of transmit power will be limited. Therefore, a difference between smaller candidate PRB-numbers in the first candidate PRB-number set can be set to be small, and a difference between large candidate PRB-numbers in the first candidate PRB-number set can be set to be large. By setting the granularity of the candidate PRB-number to be greater than 1 PRB and distributing the candidate PRB-numbers unevenly, it is conducive to balancing between system overhead and coverage performance.

As an example, if it is determined, according to the preset rule, that the first PRB-number is 32, the candidate PRB-numbers in the first candidate PRB-number set may be those as shown in Table 2.

TABLE 2

| PRB-number index | Candidate PRB-number |
|---|---|
| 0 | 1 |
| 1 | 2 |
| 2 | 4 |
| 3 | 6 |
| 4 | 8 |
| 5 | 12 |
| 6 | 24 |
| 7 | 30 |

In some embodiments, before establishing an RRC connection with the terminal device, the network device may determine the target PRB-number according to the first candidate PRB-number set. For example, the network device may select a candidate PRB-number from the first candidate PRB-number set and take the selected candidate PRB-number as the target PRB-number.

In some embodiments, the network device may determine the target PRB-number according to a PRB number supported by an initial UL BWP.

As described above, a PUCCH resource set used for PUCCH transmission in initial access includes K PUCCH resources, and the K PUCCH resources are implemented by means of frequency division multiplexing and code division multiplexing. A code division multiplexing capacity is determined according to the number $N_{cs}$ of initial CS indexes, and a frequency division multiplexing capacity is determined according to the size of the initial UL BWP and the size of a PRB bandwidth.

In some embodiments, the total number K of PUCCH resources in the PUCCH resource set for initial access is 16. The following will take K=16 as an example for illustration, but the disclosure is not limited thereto.

In some embodiments, the network device may calculate, according to the PRB-number supported by the initial UL BWP and the code division multiplexing capacity of a PUCCH resource, whether all PUCCH resources in a PUCCH resource set can be supported when the first PRB-number is taken as the target PRB-number (i.e. target number of PRBs) occupied by each PUCCH resource.

For example, if the initial UL BWP-based frequency division multiplexing capacity and the code division multiplexing capacity cannot support all the PUCCH resources in the PUCCH resource set, the network device may determine, according to the PRB number supported by the initial UL BWP and the code division multiplexing capacity of a PUCCH resource, a maximum PRB-number (i.e. maximum number of PRBs) that can be occupied by each PUCCH resource, and then determine the target PRB-number according to the maximum PRB-number that can be occupied by each PUCCH resource. For example, the network device may determine the target PRB-number from the first candidate PRB-number set according to the maximum PRB-number that can be occupied by each PUCCH resource. As an example, a candidate PRB-number in the first candidate PRB-number set, which does not exceed the maximum PRB-number that can be occupied by each PUCCH resource, is taken as the target PRB-number.

Taking the first subcarrier spacing of 120 kHz and $N_{cs}$=2 as an example for illustration, if support for PUCCH transmission with the PRB-number $\max(N_{RB})$ on each of the multiple PUCCH resources is required for the initial UL BWP, a PRB number supposed to be supported by the initial UL BWP is $(16/N_{cs})*\max(N_{RB})$, that is, the PRB number supposed to be supported by the initial UL BWP is (16/2)*34=272 PRBs.

If the initial UL BWP is 100 MHz and the first subcarrier spacing is 120 kHz, the initial UL BWP theoretically supports only $\lfloor 100\text{ MHz}/1.44\text{ MHz}\rfloor=69$ PRBs and cannot support 272 PRBs. That is, the network device cannot take the first PRB-number as the target PRB-number used by the terminal device for PUCCH transmission. In this case, the network device can adjust the first PRB-number according to a PRB number actually supported by the initial UL BWP and the code division multiplexing capacity of a PUCCH resource, thereby determining the target PRB-number.

For example, the network device may determine the maximum PRB-number that can be occupied by each PUCCH resource according to the following formula: $\lfloor 69/(16/N_{cs})\rfloor=\lfloor 69/8\rfloor=8$, and then determine the target PRB-number according to the maximum PRB-number.

For example, the network device may determine, from the first candidate PRB-number set, a candidate PRB-number that does not exceed the maximum PRB-number as the target PRB-number. Taking the first candidate PRB-number set shown in Table 2 as an example, it can be determined that the target PRB-number is 8. In other embodiments, if the maximum PRB-number is 10, it can be determined that the target PRB-number is 8 with reference to the first candidate PRB-number set shown in Table 2.

Further, the network device may send indication information to the terminal device. The indication information indicates a PRB number used by the terminal device in the non-connected state for PUCCH transmission, in other words, the indication information indicates a PRB number used for PUCCH transmission in initial access. For example, the indication information may indicate the target PRB-number.

In some embodiments, the network device may indicate the target PRB-number via a system message. For example, the system message may include system information block (SIB) 1.

Figure 3:
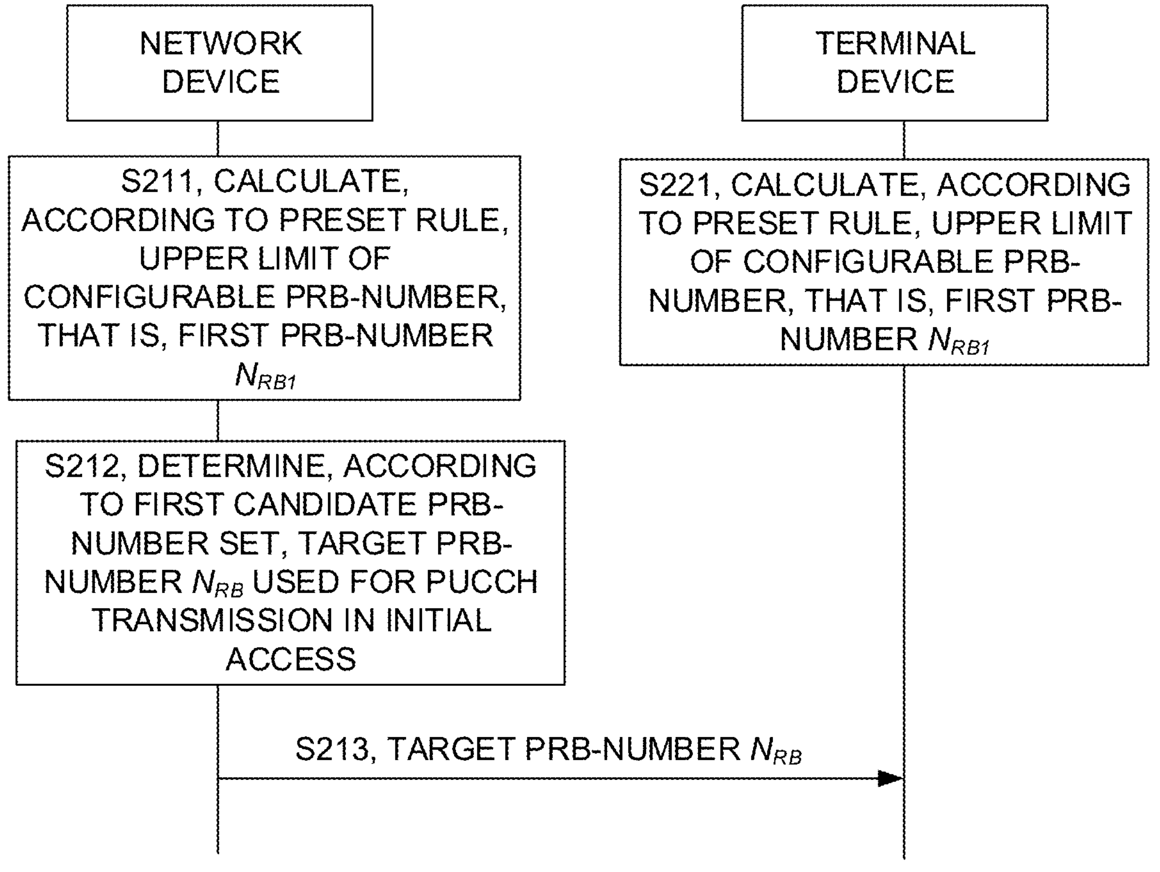
FIG. 3 is a schematic diagram illustrating an implementation of determining a target physical resource block (PRB)-number according to embodiments of the disclosure.

With reference to FIG. 3, a scheme for determining the target PRB-number used for PUCCH transmission in initial access will be described. As illustrated in FIG. 3, the scheme may include the following.

S211, the network device determines the first PRB-number according to the preset rule.

S221, the terminal device determines the first PRB-number according to the preset rule.

It should be understood that, there is no limitation on the execution order between S211 and S221 in the disclosure.

For the implementation of S211 and S221, reference can be made to related elaborations in the foregoing embodiments, which will not be described in detail again herein.

Further, S212, the network device determines, according to the first candidate PRB-number set, the target PRB-number used for PUCCH transmission in initial access.

S213, the network device sends to the terminal device the target PRB-number used for PUCCH transmission in initial access, for example, sends the target PRB-number via a system message.

For the implementation of S212 and S213, reference can be made to related elaborations in the foregoing embodiments, which will not be described in detail again herein.

In some embodiments of the disclosure, after establishing an RRC connection with the terminal device, the network device may determine the target PRB-number used for PUCCH transmission according to information such as a capability (e. g. a hardware condition) and/or a current channel condition of the terminal device.

As example I, the terminal device may report to the network device a maximum PRB-number supported by PUCCH transmission of the terminal device, which is denoted as a second PRB-number. The second PRB-number is determined by the terminal device according to the hardware condition of the terminal device. For example, the terminal device may determine the second PRB-number according to information such as a maximum terminal conducted power and/or a maximum terminal EIRP supported by the terminal device, and then send the second PRB-number to the network device.

As example II, the terminal device may report to the network device the hardware condition of the terminal device, for example, information such as a maximum terminal conducted power and/or a maximum terminal EIRP supported by the terminal device. Then the network device determines the second PRB-number.

Optionally, the first PRB-number is greater than or equal to the second PRB-number.

After the RRC connection is established, if a transmit power of the terminal device is limited by the hardware condition, for example, a maximum transmit power UE_P=23 dBm and a transmit beamforming gain Tx_BF=12 decibels relative to isotropic (dBi), a bandwidth where the hardware limitation will be reached is calculated as $$BW = 10^{(UE_P + TX_{BF} - PSD)/10} = 10^{(23+12-23)/10} = 15.8 \text{ MHz}.$$

Taking the first subcarrier spacing of 120 kHz as an example, based on the bandwidth where the hardware condition limitation will be reached, it may be determined that the second PRB-number is BW/1.44=12 PRBs. That is, the upper limit of the configurable PRB-number is adjusted to the second PRB-number from the first PRB-number. Then the terminal device reports the second PRB-number to the network device, and subsequently, the network device may determine the target PRB-number based on the second PRB-number.

In some embodiments of the disclosure, the network device may determine the target PRB-number according to a second candidate PRB-number set.

In some embodiments, the second candidate PRB-number set is used for determining the target PRB-number used by the terminal device in the connected state for PUCCH transmission, in other words, the second candidate PRB-number set is used for determining the target PRB-number corresponding to PUCCH transmission in the connected mode.

In some embodiments, the second candidate PRB-number set includes at least one candidate PRB-number, and each of the at least one candidate PRB-number does not exceed the first PRB-number.

In other embodiments, the second candidate PRB-number set includes at least one candidate PRB-number, and each of the at least one candidate PRB-number does not exceed the second PRB-number.

In some embodiments, a granularity of the candidate PRB-number in the second candidate PRB-number set is greater than or equal to 1 PRB.

In some embodiments, PRB-number differences between the candidate PRB-numbers in the second candidate PRB-number set are unequal or equal.

It should be understood that, in embodiments of the disclosure, the second candidate PRB-number set may be stored in the network device and the terminal device in a table or a list, and there is no limitation on the manner of storing the second candidate PRB-number set in the disclosure. In the following elaborations, the second candidate PRB-number set is stored exemplarily in a table, but the disclosure is not limited thereto.

In some embodiments, each candidate PRB-number in the second candidate PRB-number set corresponds to one index. After determining the target PRB-number, the network device may indicate to the terminal device an index corresponding to the target PRB-number. Accordingly, the terminal device can consult a table corresponding to the second candidate PRB-number set according to the index, and determine a candidate PRB-number corresponding to the index as the target PRB-number.

In some embodiments, the network device may determine the second candidate PRB-number set based on the second PRB-number.

In some embodiments, the terminal device may also determine the second candidate PRB-number set based on the second PRB-number. In other words, the network device and the terminal device may determine the second candidate PRB-number set in a consistent mode, that is, the network device and the terminal device have consistent understanding regarding the candidate PRB-number in the second candidate PRB-number set.

As an example, if the second PRB-number is 12, the candidate PRB-numbers in the second candidate PRB-number set may be those as shown in Table 3.

TABLE 3

| PRB-number index | Candidate PRB-number |
|---|---|
| 0 | 1 |
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| 10 | 11 |
| 11 | 12 |

In other embodiments, the network device may also determine the second candidate PRB-number set according to the preset rule. For example, the network device may determine the second candidate PRB-number set according to the preset rule when the network device does not know capability information of the terminal device.

For example, the network device firstly determines the first PRB-number according to the preset rule, and then determines the second candidate PRB-number set according to the first PRB-number.

Correspondingly, the terminal device may also determine the second candidate PRB-number set according to the preset rule. For example, the terminal device firstly determines the first PRB-number according to the preset rule, and then determines the second candidate PRB-number set according to the first PRB-number.

As an example, if it is determined, according to the preset rule, that the first PRB-number is 32, the candidate PRB-numbers in the second candidate PRB-number set may be those as shown in Table 4.

TABLE 4

| PRB-number index | Candidate PRB-number |
|---|---|
| 0 | 1 |
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| 10 | 11 |
| 11 | 12 |
| 12 | 18 |
| 13 | 24 |
| 14 | 30 |

In some embodiments, the network device may configure for the terminal device the target PRB-number used for PUCCH transmission from the second candidate PRB-number set based on a channel condition of the terminal device. For example, if the channel condition of the terminal device is relatively good, a small candidate PRB-number can be selected from the second candidate PRB-number set; and if the channel condition of the terminal device is poor, a large candidate PRB-number can be selected from the second candidate PRB-number set, which is beneficial to ensuring reliability of UL transmission. On the other hand, if channel quality is relatively high, by adopting a small PRB-number for PUCCH transmission, it is possible to facilitate frequency division multiplexing of more UEs, thereby improving spectral efficiency. Therefore, by adopting the scheme for determining the target PRB-number in embodiments of the disclosure, it is beneficial to improving overall performance of UL transmission.

Further, the network device sends indication information to the terminal device, the indication information indicates a PRB number used by the terminal device in the connected state for PUCCH transmission, that is, the indication information indicates a PRB number used for PUCCH transmission in the connected state. For example, the indication information may indicate a PRB-number index in a table corresponding to the second candidate PRB-number set. After receiving the PRB-number index, the terminal device may consult the table corresponding to the second candidate PRB-number set to obtain a candidate PRB-number indicated by the PRB-number index, and then take the obtained candidate PRB-number as the target PRB-number used for PUCCH transmission.

Optionally, the indication information may be sent via higher-layer signaling, where the higher-layer signaling may include, for example, RRC signaling.

Figure 4:
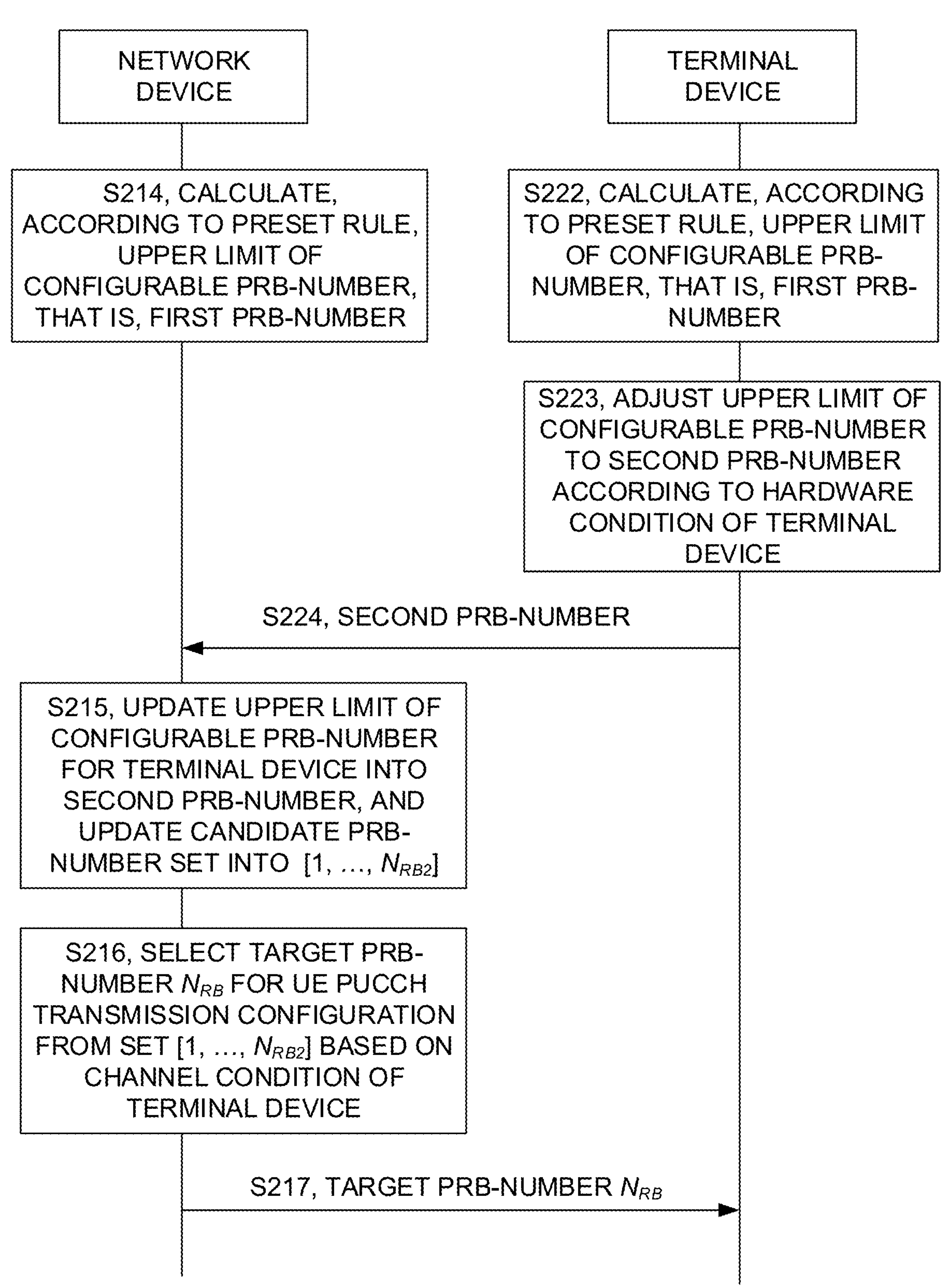
FIG. 4 is a schematic diagram illustrating an implementation of determining a target PRB-number according to other embodiments of the disclosure.

With reference to FIG. 4, a scheme for determining the target PRB-number used for PUCCH transmission in the connected mode will be described. As illustrated in FIG. 4, the scheme may include the following.

S214, the network device determines the first PRB-number according to the preset rule.

S222, the terminal device determines the first PRB-number according to the preset rule.

It should be understood that, there is no limitation on an execution order between S214 and S222 in the disclosure.

S223, the terminal device adjusts an upper limit of a PRB number used for PUCCH transmission according to the hardware condition of the terminal device, and denotes the adjusted PRB-number as the second PRB-number.

S224, the terminal device reports the second PRB-number to the network device.

Further, S215, the network device updates the upper limit of the PRB-number used for PUCCH transmission in a connection mode, updates a candidate PRB-number set, and denotes the updated candidate PRB-number set as the second candidate PRB-number set, for example, $[1, \ldots, N_{RB2}]$, where $N_{RB2}$ represents the second PRB-number.

S216, the network device selects the target PRB-number from the second candidate PRB-number set based on a channel condition of the terminal device.

S217, the network device sends indication information to the terminal device, where the indication information indicates the target PRB-number.

In other embodiments, the terminal device in the connected state may not report the second PRB-number, or may not report the capability of the terminal device. In this case, the network device may determine the target PRB-number according to the first PRB-number.

As can be seen from embodiment I, by determining the target PRB-number corresponding to PUCCH transmission by means of the implementation in embodiment I, it is beneficial to ensuring that the terminal device performs PUCCH transmission with an optimal PRB-number. The optimal PRB-number herein may refer to an optimal PRB-number when the channel condition of the terminal device is taken into consideration. For example, if a channel quality is high, PUCCH transmission will be performed with a small PRB-number; or if the channel quality is low, PUCCH transmission will be performed with a large PRB-number, which is beneficial to taking both reliability and spectral efficiency of PUCCH transmission into consideration. Alternatively, the optimal PRB-number may refer to a maximum PRB-number under the preset rule and/or limitations of the hardware condition of the terminal device. By performing PUCCH transmission with a PRB number as large as possible, it is conducive to improving coverage performance of PUCCH transmission.

Embodiment II

In some embodiments of the disclosure, the terminal device determines the target PUCCH resource corresponding to the PUCCH as follows. The terminal device determines, according to the target PRB-number $N_{RB}$, a target comb interval M used for transmitting the PUCCH, where the target comb interval M represents an RE number (that is, the number of REs) between adjacent REs in the target PUCCH resource.

Therefore, in embodiments of the disclosure, in the PRB resources of the target PRB-number $N_{RB}$ (that is, $N_{RB}$ PRB resources), an RE subset (i.e. a subset of REs) in these PRBs can be used for PUCCH transmission, that is, sub-PRB interlaced mapping can be used for PUCCH transmission, which is beneficial to improving spectral efficiency.

In some embodiments, if $N_{RB}<12$, $N_{RB}$ REs are determined as the target comb interval.

In other embodiments, if $N_{RB}=12$, 12 REs are determined as the target comb interval.

In other embodiments, if $N_{RB}>12$, 12 REs are determined as the target comb interval.

That is, if the target PRB-number is greater than 12, 12 REs may be used fixedly as the target comb interval; and if the target PRB-number is less than or equal to 12, the target comb interval is equal to the target PRB-number $N_{RB}$, where the target comb interval is in a unit of RE.

In some embodiments, if $N_{RB}<12$, the target PUCCH resource includes 12 REs in the $N_{RB}$ PRBs.

In other embodiments, if $N_{RB}=12$, the target PUCCH resource includes 12 REs in 12 PRBs, where the target PUCCH resource occupies one RE in each PRB.

In other embodiments, if $N_{RB}>12$, the target PUCCH resource includes $N_{RB}$ REs.

In some embodiments, if $N_{RB}<12$ and 12 is divisible by $N_{RB}$, an RE number in each PRB in the target PUCCH resource is the same, and an interval between adjacent REs is $N_{RB}$ REs.

In other embodiments, if $N_{RB}<12$ and 12 is not divisible by $N_{RB}$, the RE number in each PRB in the target PUCCH resource is different, and the interval between adjacent REs is $N_{RB}$ REs.

In other embodiments, if $N_{RB}=12$, the RE number in each PRB in the target PUCCH resource is 1, and the interval between adjacent REs is 12 REs.

In other embodiments, if $N_{RB}>12$, the RE number in each PRB in the target PUCCH resource is 1, and $N_{RB}$ is a multiple of 6.

In embodiments of the disclosure, a sub-PRB interlaced mapping pattern in which a comb interval is M REs (where $1 \le M \le 12$) is denoted as comb-M.

In some embodiments, if $N_{RB} \le 12$ and 12 is divisible by $N_{RB}$, such as $N_{RB}=1/2/3/4/6/12$, a sub-PRB interlaced mapping pattern of comb-1/2/3/4/6/12 is adopted for the target PUCCH resource in each of the $N_{RB}$ PRBs.

Figure 5:
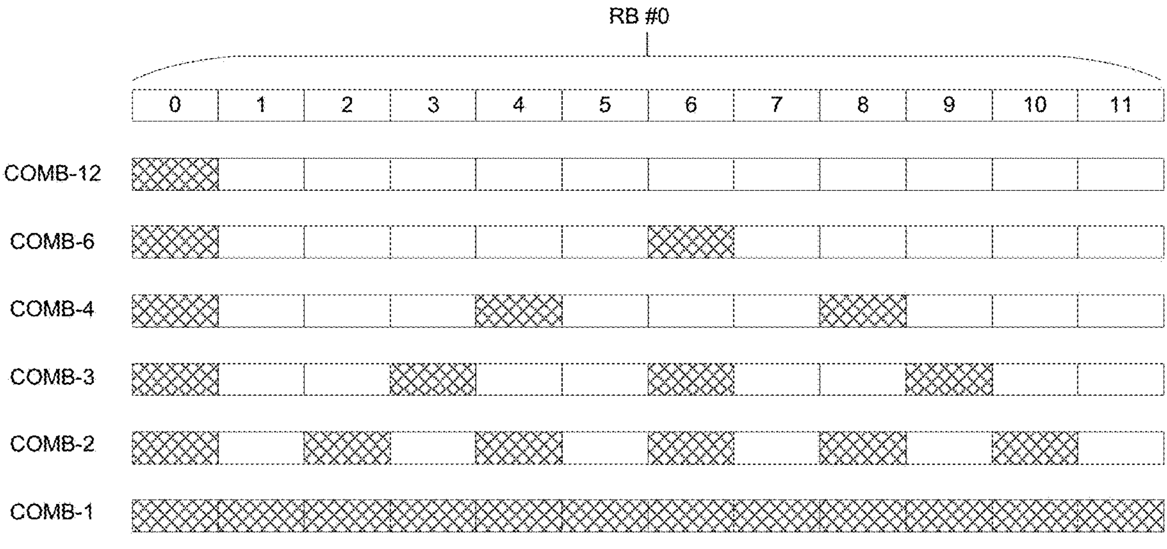
FIG. 5 is a schematic diagram illustrating sub-PRB interlaced mapping patterns according to some embodiments of the disclosure.

FIG. 5 is a schematic diagram illustrating the sub-PRB interlaced mapping pattern of comb-1/2/3/4/6/12 in one PRB. As illustrated in FIG. 5, for a sub-PRB interlaced mapping pattern of comb-1, an interval between REs for one PUCCH transmission is 1 RE. For a sub-PRB interlaced mapping pattern of comb-2, the interval between REs for one PUCCH transmission is 2 REs. For a sub-PRB interlaced mapping pattern of comb-3, the interval between REs for one PUCCH transmission is 3 REs. For a sub-PRB interlaced mapping pattern of comb-4, the interval between REs for one PUCCH transmission is 4 REs. For a sub-PRB interlaced mapping pattern of comb-6, the interval between REs for one PUCCH transmission is 6 REs. For a sub-PRB interlaced mapping pattern of comb-12, the interval between REs for one PUCCH transmission is 12 REs.

Further, an RE(s) occupied by PUCCH transmission in each of the $N_{RB}$ PRBs (in other words, an RE(s) occupied by the target PUCCH resource in each of the $N_{RB}$ PRBs) is determined based on sub-PRB interlaced mapping.

Figure 6:
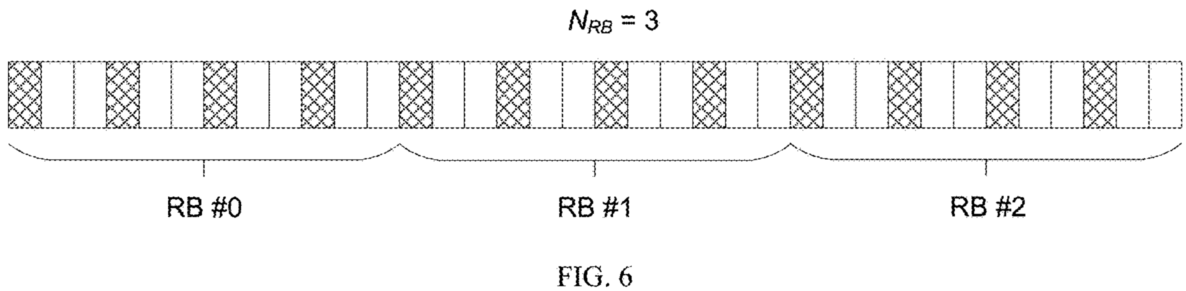
FIG. 6 is a schematic diagram illustrating resource elements (REs) occupied by physical uplink control channel (PUCCH) transmission in 3 PRBs, taking $N_{RB}=3$ as an example.

For example, as illustrated in FIG. 6, for the sub-PRB interlaced mapping pattern of comb-3, the target PUCCH resource occupies 4 REs in each of 3 PRBs (for example, RB #0, RB #1, and RB #2), and the interval between adjacent REs is 3 REs.

Therefore, if $N_{RB}\leq 12$ and 12 is divisible by $N_{RB}$, an RE number onto which the target PUCCH resource is mapped in each of the $N_{RB}$ PRBs is the same.

In other embodiments, if $N_{RB}\leq 12$ and 12 is not divisible by $N_{RB}$, for example, $N_{RB}$=5/7/8/9/10/11, a sub-PRB interlaced mapping pattern of comb-5/7/8/9/10/11 is adopted for the target PUCCH resource in the $N_{RB}$ PRBs.

Figure 7:
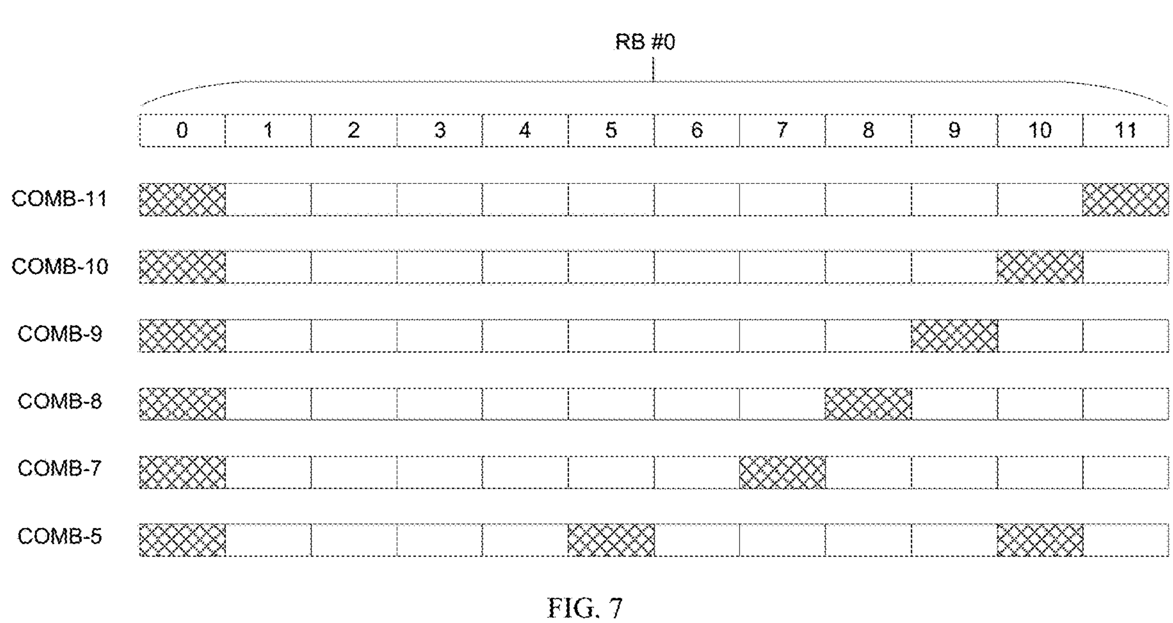
FIG. 7 is a schematic diagram illustrating sub-PRB interlaced mapping patterns according to other embodiments of the disclosure.

FIG. 7 is a schematic diagram illustrating the sub-PRB interlaced mapping pattern of comb-5/7/8/9/10/11 in one PRB. As illustrated in FIG. 7, for a sub-PRB interlaced mapping pattern of comb-5, an interval between REs for one PUCCH transmission is 5 REs. For a sub-PRB interlaced mapping pattern of comb-7, the interval between REs for one PUCCH transmission is 7 REs. For a sub-PRB interlaced mapping pattern of comb-8, the interval between REs for one PUCCH transmission is 8 REs. For a sub-PRB interlaced mapping pattern of comb-9, the interval between REs for one PUCCH transmission is 9 REs. For a sub-PRB interlaced mapping pattern of comb-10, the interval between REs for one PUCCH transmission is 10 REs. For a sub-PRB interlaced mapping pattern of comb-11, the interval between REs for one PUCCH transmission is 11 REs.

In embodiments of the disclosure, if $N_{RB}\leq 12$ and 12 is not divisible by $N_{RB}$, it is still ensured that an interval between REs occupied by the target PUCCH resource is $N_{RB}$ REs. In this case, an RE number occupied in each of the $N_{RB}$ PRBs is different.

Figure 8:
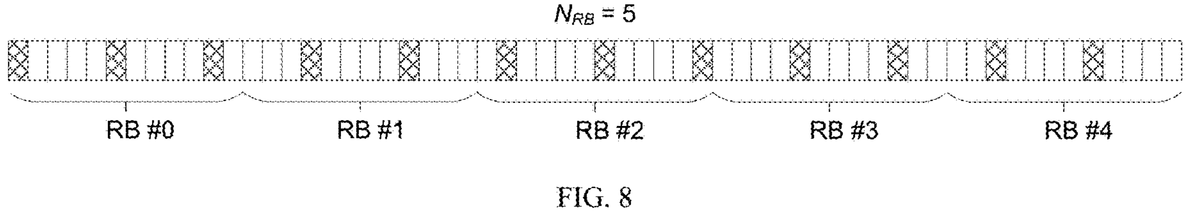
FIG. 8 is a schematic diagram illustrating REs occupied by PUCCH transmission in 5 PRBs, taking $N_{RB}=5$ as an example.

Taking $N_{RB}$=5 as an example, FIG. 8 illustrates an example of positions of REs occupied by the target PUCCH resource in 5 PRBs (for example, RB #0, RB #1, RB #2, RB #3, and RB #4). 3 REs are occupied in RB #0, 2 REs are occupied in RB #1, 3 REs are occupied in RB #2, 2 REs are occupied in RB #3, and 2 REs are occupied in RB #4, and accordingly, 12 REs are occupied in total. An interval between REs is 5 REs.

Therefore, if $N_{RB}\leq 12$ and 12 is not divisible by $N_{RB}$, an RE number onto which the target PUCCH resource is mapped in each of the $N_{RB}$ PRBs is different.

In other embodiments, if $N_{RB}\geq 12$, a sub-PRB interlaced mapping pattern of comb-12 is adopted for the target PUCCH resource in each of the $N_{RB}$ PRBs. In this case, an RE number occupied by the target PUCCH resource is the same as an PRB number occupied by the target PUCCH resource, but the PRB-number occupied is required to be a multiple of 6, that is, if $N_{RB}>12$, $N_{RB}$ mod 6=0.

Therefore, in embodiment II, after determining the target PRB-number $N_{RB}$ used for PUCCH transmission, the terminal device can determine the target comb interval M used for PUCCH transmission. In this case, by means of sub-PRB interlaced mapping, it is possible to realize frequency division multiplexing on the same PRB resource set by allocating different comb indexes, and frequency division multiplexing capacity is equal to the target comb interval M. It should be understood that, the PRB resource set herein refers to the $N_{RB}$ PRBs. The comb index indicates an RE set (i.e. a set of REs) in the $N_{RB}$ PRBs, an interval between REs in the RE set is the target comb interval M, and RE sets corresponding to different comb indexes have an RE offset, for example, an offset of P REs, where P is a positive integer and $P\leq M$.

Figure 9:
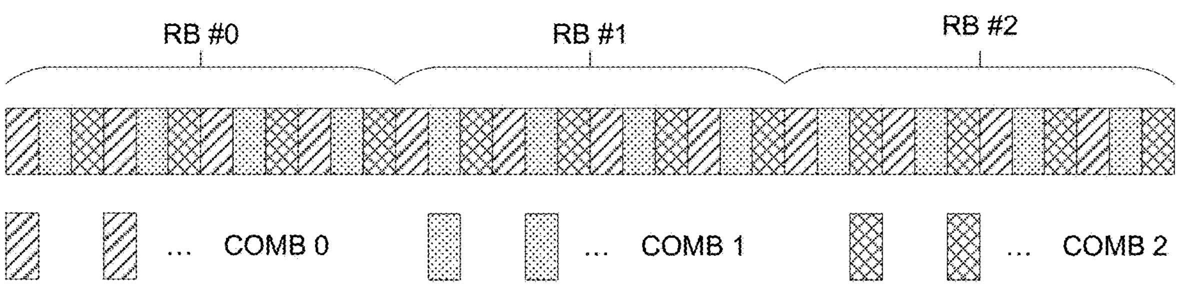
FIG. 9 is a schematic diagram illustrating frequency division multiplexing of multiple user equipments (UEs) based on different comb indexes.

As illustrated in FIG. 9, for a sub-PRB interlaced mapping pattern of comb-3, the frequency division multiplexing capacity is 3, that is, 3 terminal devices can multiplex different RE resources across the same 3 PRB resources based on different comb indexes. For example, comb index 0, comb index 1, and comb index 2 each indicate one RE set across the 3 PRBs (RB #0~RB #2), where an RE set corresponding to comb index 0 and an RE set corresponding to comb index 1 have an offset of 1 RE, and an RE set corresponding to comb index 1 and an RE set corresponding to comb index 2 have an offset of 1 RE. An RE set corresponding to each comb index is obtained through mapping in the interlaced mapping pattern of comb-3.

Therefore, in embodiments of the disclosure, by means of sub-PRB interlaced mapping described above, it is possible to realize RE-level frequency division multiplexing on the same PRB resource set. In this case, a PRB-number occupied by one PUCCH transmission is 1/M of a PRB-number when no sub-PRB comb is occupied, thereby improving spectral efficiency.

In conclusion, based on embodiment I, it is possible to determine a PRB-number, i.e. the target PRB-number, occupied by the target PUCCH resource; and based on embodiment II, it is possible to determine a mapping pattern for the target PUCCH resource in the PRBs of the target PRB-number occupied by the target PUCCH resource, that is, positions of REs mapped in each PRB. Further, in combination with embodiment III, a scheme for determining a position(s) of the target PUCCH resource will be described in detail, for example, a position of a PRB resource occupied by the target PUCCH resource, such as a start PRB position, and a comb index corresponding to the target PUCCH resource in the PRB resource(s), etc.

Embodiment III

In some embodiments of the disclosure, S210 may be implemented as follows. The terminal device determines at least one of a start PRB index corresponding to the target PUCCH resource, a comb index corresponding to REs occupied by the target PUCCH resource in the $N_{RB}$ PRBs, or an initial CS index used for code division multiplexing on the target PUCCH resource.

For example, for PUCCH transmission in initial access, the terminal device may firstly determine a position of a PRB resource occupied by the target PUCCH resource, i.e. a position of a PRB resource occupied by PUCCH transmission, for example, a start PRB position, and then determine a comb index corresponding to the target PUCCH resource in the $N_{RB}$ PRBs, that is, a comb index corresponding to PUCCH transmission in the PRB resource set, i.e. positions of REs occupied by PUCCH transmission.

In some embodiments of the disclosure, the terminal device may determine, according to a frequency division multiplexing capacity M of the $N_{RB}$ PRB resources as well as a code division multiplexing capacity $N_{cs}$, whether the $N_{RB}$ PRB resources can support a total number K of PUCCH resources (that is, the K PUCCH resources) in a PUCCH resource set for initial access, thereby determining a position(s) of the target PUCCH resource corresponding to PUCCH transmission.

Case 1: the $N_{RB}$ PRB resources can support all the PUCCH resources in the PUCCH resource set for initial access. For example, $M^*N_{cs} \geq K$.

In this case, the terminal device firstly determines the start PRB index corresponding to the target PUCCH resource.

For example, the terminal device may determine the start PRB index corresponding to the target PUCCH resource according to at least one of a PRB offset $$RB_{BWP}^{offset}$$

in an initial UL BWP, a PRB number $$N_{BWP}^{size}$$

(that is, the number of PRBs) in the initial UL BWP, or the $N_{RB}$.

In some embodiments, the PRB offset $$RB_{BWP}^{offset}$$

in the initial UL BWP may be a value shown in Table 1, such as 0, 2, 3, 4, or $$\lfloor N_{BWP}^{size}/4 \rfloor,$$

etc.

In some embodiments, if the number of orthogonal frequency-division multiplexing (OFDM) symbols occupied by PUCCH transmission is greater than or equal to 2, frequency diversity gain can be obtained by configuring frequency hopping, that is, positions of PRBs occupied by one PUCCH transmission in different symbols are different. For a PUCCH with a symbol length of L, if frequency hopping is configured, the number of OFDM symbols in a $1^{st}$ frequency-hopping unit (also known as "first hop") is $\lfloor L/2 \rfloor$, and the number of OFDM symbols in a $2^{nd}$ frequency-hopping unit is $L-\lfloor L/2 \rfloor$.

As an example, the terminal device determines that the start PRB index corresponding to the target PUCCH resource in the $1^{st}$ frequency-hopping unit is $$N_{RB}{}^{*}RB_{BWP}^{offset},$$

and determines that the start PRB index corresponding to the target PUCCH resource in the $2^{nd}$ frequency-hopping unit is $$N_{BWP}^{size} - 1 - N_{RB}{}^{*}RB_{BWP}^{offset}.$$

That is, a PRB index corresponding to PUCCH transmission in the $1^{st}$ frequency-hopping unit and a PRB index corresponding to PUCCH transmission in the $2^{nd}$ frequency-hopping unit are symmetrically distributed in the initial UL BWP.

Therefore, in embodiments of the disclosure, positions of PRBs occupied by PUCCH transmission in a frequency-hopping unit are designed according to the PRB offset $$RB_{BWP}^{offset},$$

and positions of PRBs occupied in different frequency-hopping units are designed based on symmetry, which is conducive to ensuring that PRBs occupied by PUCCH transmission in different frequency-hopping units are as far as possible, thereby maximizing frequency diversity gain obtained by frequency hopping.

As illustrated above, by means of sub-PRB interlaced mapping, it is possible to realize RE-level frequency division multiplexing of multiple PUCCH transmissions on the same PRB resource set. Therefore, in some embodiments of the disclosure, after determining a start PRB index corresponding to PUCCH transmission, the terminal device may determine a comb index corresponding to PUCCH transmission in the PRB resource set, i.e. the comb index corresponding to the REs occupied by the target PUCCH resource in the $N_{RB}$ PRBs.

For example, the terminal device determines the comb index corresponding to the REs occupied by the target PUCCH resource in the $N_{RB}$ PRBs according to at least one of a resource index $r_{PUCCH}$ corresponding to PUCCH transmission, the target comb interval M, or the number $N_{cs}$ of initial CS indexes in the initial CS index set.

As an example, the terminal device determines the comb index corresponding to the REs occupied by the target PUCCH resource in the $N_{RB}$ PRBs according to the following formula:

$$m = (\lfloor r_{PUCCH} / N_{cs} \rfloor) \bmod M$$

m represents the comb index, $\lfloor \rfloor$ represents floor, and mod represents modulo.

After determining the comb index corresponding to the target PUCCH resource in the $N_{RB}$ PRBs, the terminal device can determine positions of the REs occupied by the target PUCCH resource in the $N_{RB}$ PRBs.

Further, code division multiplexing of different PUCCH transmissions on the same frequency-domain resource can be realized based on different initial CSs. By introducing the initial CSs to implement code division multiplexing of different PUCCH transmissions, it is possible to realize multiplexing of more PUCCH transmissions on the same frequency-domain resource. Therefore, in some embodiments of the disclosure, the terminal device may also determine the initial CS index used for code division multiplexing on the target PUCCH resource.

In some embodiments, the terminal device may determine the initial CS index used for code division multiplexing on the target PUCCH resource according to the resource index $r_{PUCCH}$ corresponding to PUCCH transmission and the number $N_{cs}$ of initial CS indexes in the initial CS index set.

For example, the terminal device determines the initial CS index used for code division multiplexing on the target PUCCH resource according to the following formula:

$$n_{cs} = r_{PUCCH} \bmod N_{cs}$$

$n_{cs}$ represents the initial CS index, and mod represents modulo.

In some embodiments, $r_{PUCCH}$ is determined according to the following formula:

$$r_{PUCCH} = \left\lfloor \frac{2 \cdot n_{CCE,0}}{N_{CCE}} \right\rfloor + 2 \cdot \Delta_{PRI}$$

$N_{CCE}$ represents the number of control channel elements (CCEs) in a control resource set (CORESET) on which downlink scheduling signaling received by the terminal device is located, $n_{CCE,0}$ represents an index of the 1st CCE for the downlink scheduling signaling received by the terminal device, and $\Delta_{PRI}$ represents a value of a PUCCH resource indicator field in the downlink scheduling signaling.

In some embodiments, the downlink scheduling signaling may be downlink control information (DCI).

In some embodiments, the network device may configure, via a system message, a PUCCH resource set for the terminal device that is used before RRC connection establishment. Subsequently, if the terminal device needs to feed back hybrid automatic repeat request acknowledgement (HARQ-ACK) information of the downlink scheduling signaling on a PUCCH, the terminal device can determine, according to $r_{PUCCH}$ a position of a resource for transmitting the PUCCH.

Figure 10:
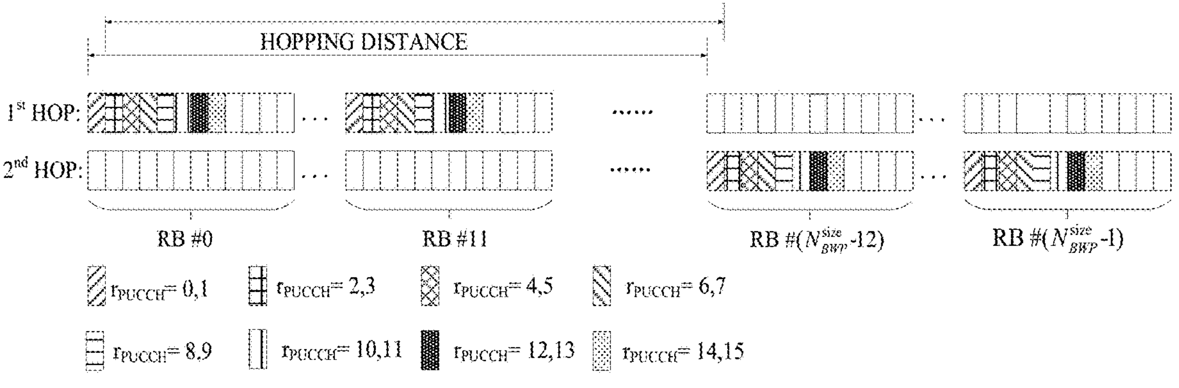
FIG. 10 is a diagram illustrating mapped positions of a resource for PUCCH transmission according to an example of the disclosure.

FIG. 10 is a schematic diagram illustrating mapped positions of a resource for PUCCH transmission according to an example of the disclosure.

In the example illustrated in FIG. 10, in initial access, $r_{PUCCH} \in \{0, 1, \ldots, 15\}$, $$RB_{BWP}^{offset} = 0,$$

M=12, and $N_{cs}$=2, that is, the frequency division multiplexing capacity is 12 and the code division multiplexing capacity is 2, in other words, the frequency division multiplexing capacity and the code division multiplexing capacity can support 24 PUCCH resources, i.e. $M*N_{cs}>K$. In this case, 16 PUCCH resources in the PUCCH resource set for initial access can be supported by 8 REs in each PRB in a PRB resource set and 2 initial CSs, and each PUCCH resource can be used for one PUCCH transmission.

In frequency domain, each PUCCH resource may occupy one RE in each PRB in the PRB resource set. In code domain, each PUCCH resource may use one of the two initial CSs.

As illustrated in FIG. 10, based on the foregoing scheme for determining the start PRB index, it may be determined that a start PRB index corresponding to each PUCCH resource in the 1st frequency-hopping unit is 0, and a start PRB index corresponding to each PUCCH resource in the 2nd frequency-hopping unit is $$N_{BWP}^{size} - 1.$$

Therefore, the 16 PUCCH transmissions in initial access have an equal hopping distance with a maximized frequency hopping gain.

It should be understood that, in FIG. 10, PUCCH transmission corresponding to $r_{PUCCH}$=10 and PUCCH transmission corresponding to $r_{PUCCH}$=1 are multiplexed on the same RE through code division multiplexing, PUCCH transmission corresponding to $r_{PUCCH}$=2 and PUCCH transmission corresponding to $r_{PUCCH}$=3 are multiplexed on the same RE through code division multiplexing, PUCCH transmission corresponding to $r_{PUCCH}$=4 and PUCCH transmission corresponding to $r_{PUCCH}$=5 are multiplexed on the same RE through code division multiplexing, PUCCH transmission corresponding to $r_{PUCCH}$=6 and PUCCH transmission corresponding to $r_{PUCCH}$=7 are multiplexed on the same RE through code division multiplexing, PUCCH transmission corresponding to $r_{PUCCH}$=8 and PUCCH transmission corresponding to $r_{PUCCH}$=9 are multiplexed on the same RE through code division multiplexing, PUCCH transmission corresponding to $r_{PUCCH}$=10 and PUCCH transmission corresponding to $r_{PUCCH}$=11 are multiplexed on the same RE through code division multiplexing, PUCCH transmission corresponding to $r_{PUCCH}$=12 and PUCCH transmission corresponding to $r_{PUCCH}$=13 are multiplexed on the same RE through code division multiplexing, and PUCCH transmission corresponding to $r_{PUCCH}$=14 and PUCCH transmission corresponding to $r_{PUCCH}$=15 are multiplexed on the same RE through code division multiplexing.

Case 2: the $N_{RB}$ PRB resources cannot support all the PUCCH resources in the PUCCH resource set for initial access, for example, $M*N_{cs}<K$, that is, multiple PRB resource sets (namely, multiple sets of $N_{RB}$ PRBs) are needed to support all the PUCCH resources in the PUCCH resource set for initial access.

In this case, the terminal device firstly determines the start PRB index corresponding to the target PUCCH resource.

For example, the terminal device determines the start PRB index corresponding to the target PUCCH resource according to at least one of a resource index $r_{PUCCH}$ corresponding to PUCCH transmission, a PRB offset $$RB_{BWP}^{offset}$$

in an initial UL BWP, an PRB number $$N_{BWP}^{size}$$

in the initial UL BWP, or an RE-number in the UL BWP $N_{RB}$.

In some embodiments, the PRB offset $$RB_{BWP}^{offset}$$

in the initial UL BWP is a value shown in Table 1, such as 0, 2, 3, 4, or $$\lfloor N_{BWP}^{size}/4 \rfloor,$$

etc.

In case 2, based on the frequency division multiplexing capacity M of each PRB resource set as well as the code division multiplexing capacity $N_{cs}$, each set of $N_{RB}$ PRBs still supports multiplexing of $M*N_{cs}$ users, but $M*N_{cs}<K$. Therefore, multiple PRB resource sets are needed to support the K PUCCH resources.

Taking the K PUCCH resources being 16 PUCCH resources as an example, a scheme for determining a start PRB index for PUCCH transmission corresponding to $r_{PUCCH}$ (that is, a scheme for determining the start PRB index corresponding to the target PUCCH resource) will be elaborated below. As an example, if $\lfloor r_{PUCCH}/8 \rfloor=0$, determine that the start PRB index corresponding to PUCCH transmission corresponding to $r_{PUCCH}$ in a 1st frequency-hopping unit is $$N_{RB}^{*}\left(RB_{BWP}^{offset} + \lfloor r_{PUCCH}/(M*N_{\alpha}) \rfloor\right),$$

and determine that the start PRB index corresponding to PUCCH transmission corresponding to $r_{PUCCH}$ in a 2nd frequency-hopping unit is $$N_{BWP}^{size} - 1 - N_{RB}^{*}\left(RB_{BWP}^{offset} + \lfloor r_{PUCCH}/(M*N_{CS}) \rfloor\right).$$

That is, a PRB index corresponding to PUCCH transmission in the 1st frequency-hopping unit and a PRB index corresponding to PUCCH transmission in the 2nd frequency-hopping unit are symmetrically distributed in the initial UL BWP.

As an example, if $\lfloor r_{PUCCH}/8 \rfloor=1$, determine that the start PRB index corresponding to PUCCH transmission corresponding to $r_{PUCCH}$ in the 1st frequency-hopping unit is $$N_{BWP}^{size} - 1 - N_{RB}^{*}\left(RB_{BWP}^{offset} + \lfloor (r_{PUCCH}-8)/(M*N_{cs}) \rfloor\right),$$

and determine that the start PRB index corresponding to PUCCH transmission corresponding to $r_{PUCCH}$ in the 2nd frequency-hopping unit is $$N_{RB}^{*}\left(RB_{BWP}^{offset} + \lfloor (r_{PUCCH}-8)/(M*N_{cs}) \rfloor\right).$$

That is, a PRB index corresponding to PUCCH transmission in the 1st frequency-hopping unit and a PRB index corresponding to PUCCH transmission in the 2nd frequency-hopping unit are symmetrically distributed in the initial UL BWP.

$\lfloor\ \rfloor$ represents floor. For the manner of determining $r_{PUCCH}$, reference can be made to related elaborations in case 1, which will not be described in detail again herein for the sake of brevity.

Therefore, in embodiments of the disclosure, 16 PUCCH resources (that is, 16 PUCCH transmissions) are divided into two sets, namely, PUCCH transmissions corresponding to $r_{PUCCH} \in \{0, 1, \ldots, 7\}$ and PUCCH transmissions corresponding to $r_{PUCCH} \in \{8, 9, \ldots, 15\}$. PRBs at two ends of the initial UL BWP are correspondingly allocated to the two sets of PUCCH transmissions. For each PUCCH transmission, a PRB index corresponding to the PUCCH transmission in the 1st frequency-hopping unit and a PRB index corresponding to the PUCCH transmission in the 2nd frequency-hopping unit are symmetrically designed. As such, it is possible to maximize frequency diversity gain obtained by frequency hopping.

As described above, by means of sub-PRB interlaced mapping, it is possible to realize RE-level frequency division multiplexing of multiple PUCCH transmissions on the same PRB resource set. Therefore, in some embodiments of the disclosure, after determining the start PRB index corresponding to PUCCH transmission, the terminal device may determine a comb index corresponding to PUCCH transmission in $N_{RB}$ PRB resources, i.e. the comb index corresponding to the REs occupied by the target PUCCH resource in the $N_{RB}$ PRBs.

For example, the terminal device determines the comb index corresponding to the REs occupied by the target PUCCH resource in the $N_{RB}$ PRBs according to at least one of the resource index $r_{PUCCH}$ corresponding to PUCCH transmission, the target comb interval M, or the number $N_{cs}$ of initial CS indexes in the initial CS index set.

As an example, the terminal device determines the comb index corresponding to the REs occupied by the target PUCCH resource in the $N_{RB}$ PRBs according to the following formula:

$$m = \left(\lfloor r_{PUCCH}/N_{cs} \rfloor\right) \bmod M$$

m represents the comb index, $\lfloor\ \rfloor$ represents floor, and mod represents modulo.

After determining the comb index corresponding to the target PUCCH resource in the $N_{RB}$ PRBs, the terminal device can determine positions of the REs occupied by the target PUCCH resource in the $N_{RB}$ PRBs.

Further, code division multiplexing of different PUCCH transmissions on the same frequency-domain resource can be realized based on different initial CSs. By introducing the initial CSs to implement code division multiplexing of different PUCCH transmissions, it is possible to realize multiplexing of more PUCCH transmissions on the same frequency-domain resource. Therefore, in some embodiments of the disclosure, the terminal device may also determine an initial CS index used for code division multiplexing on the target PUCCH resource.

For example, the terminal device determines the initial CS index used for code division multiplexing on the target PUCCH resource according to at least one of the resource index $r_{PUCCH}$ corresponding to PUCCH transmission or the number $N_{cs}$ of initial CS indexes in the initial CS index set.

As an example, the terminal device determines the initial CS index used for code division multiplexing on the target PUCCH resource according to the following formula:

$$n_{cs} = r_{PUCCH} \bmod N_{cs}$$

$n_{cs}$ represents the initial CS index, and mod represents modulo.

Figure 11:
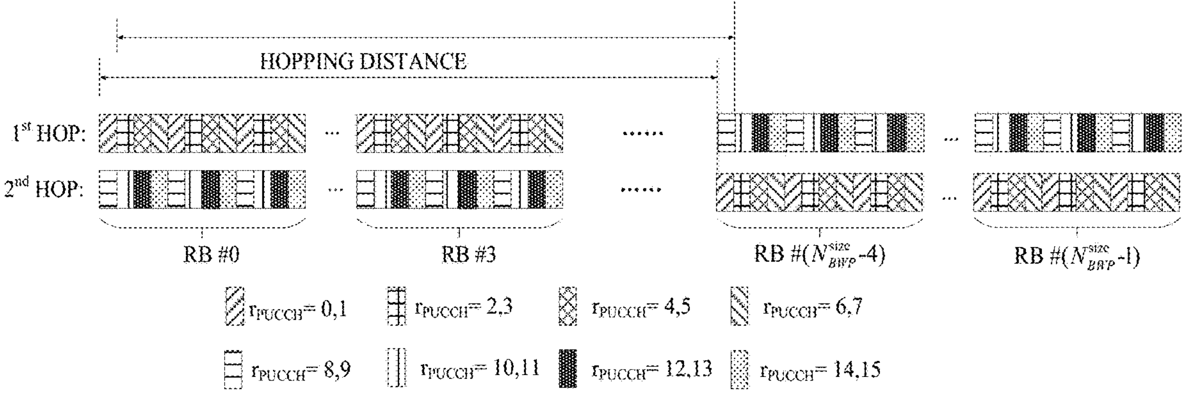
FIG. 11 is a diagram illustrating mapped positions of a resource for PUCCH transmission according to another example of the disclosure.

FIG. 11 is a diagram illustrating mapped positions of a resource for PUCCH transmission according to an example of the disclosure.

In the example illustrated in FIG. 11, $$RB_{BWP}^{offset} = 0,\ M = 4,\ N_{cs} = 2,$$

i.e. the frequency division multiplexing capacity is 4 and the code division multiplexing capacity is 2, in other words, the frequency division multiplexing capacity and the code division multiplexing capacity can support only 8 PUCCH resources, that is, $M*N_{cs}<K$. In this case, the 16 PUCCH resources in the PUCCH resource set for initial access can be supported by REs in each PRB in two PRB resource sets (that is, two sets of PRB resources) and two initial CSs, and each PUCCH resource can be used for one PUCCH transmission.

If $r_{PUCCH}\in\{0, 1, \ldots, 7\}$, PUCCH transmission corresponding to $r_{PUCCH}$ occupies RB #0~RB #3 in a 1st hop and occupies $$RB\#(N_{BWP}^{size} - 1) - RB\#(N_{BWP}^{size} - 4)$$

in a 2nd hop. If $r_{PUCCH}\in\{8, 9, \ldots, 15\}$, PUCCH transmission corresponding to $r_{PUCCH}$ occupies $$RB\#(N_{BWP}^{size} - 1) - RB\#(N_{BWP}^{size} - 4)$$

in the 1st first hop and occupies RB #0~RB #3 in the 2nd hop. In this case, it is still possible to ensure that the 16 PUCCH transmissions in initial access have an equal hopping distance with a maximized frequency hopping gain.

It should be understood that, in FIG. 11, PUCCH transmission corresponding to $r_{PUCCH}=0$ and PUCCH transmission corresponding to $r_{PUCCH}=1$ are multiplexed on the same RE through code division multiplexing, PUCCH transmission corresponding to $r_{PUCCH}=2$ and PUCCH transmission corresponding to $r_{PUCCH}=3$ are multiplexed on the same RE through code division multiplexing, PUCCH transmission corresponding to $r_{PUCCH}=4$ and PUCCH transmission corresponding to $r_{PUCCH}=5$ are multiplexed on the same RE through code division multiplexing, PUCCH transmission corresponding to $r_{PUCCH}=6$ and PUCCH transmission corresponding to $r_{PUCCH}=7$ are multiplexed on the same RE through code division multiplexing, PUCCH transmission corresponding to $r_{PUCCH}=8$ and PUCCH transmission corresponding to $r_{PUCCH}=9$ are multiplexed on the same RE through code division multiplexing, PUCCH transmission corresponding to $r_{PUCCH}=10$ and PUCCH transmission corresponding to $r_{PUCCH}=11$ are multiplexed on the same RE through code division multiplexing, PUCCH transmission corresponding to $r_{PUCCH}=12$ and PUCCH transmission corresponding to $r_{PUCCH}=13$ are multiplexed on the same RE through code division multiplexing, and PUCCH transmission corresponding to $r_{PUCCH}=14$ and PUCCH transmission corresponding to $r_{PUCCH}=15$ are multiplexed on the same RE through code division multiplexing.

It should be understood that, in embodiment III, the target PUCCH resource may be a common PUCCH resource for the terminal device in the non-connected state.

As can be seen in embodiment III, the terminal device determines a start PRB index corresponding to a PUCCH resource, and determines an RE(s) occupied by the PUCCH resource in each PRB based on a sub-PRB interlaced mapping pattern, which can not only realize PUCCH transmission on multiple PRBs but also maximize frequency hopping gain.

Embodiment IV

In embodiment IV, the network device establishes an RRC connection with the terminal device. The network device may send first indication information to the terminal device, where the first indication information is used for determining the target PUCCH resource used for PUCCH transmission in the connected state.

In some embodiments, the first indication information indicates at least one of the start PRB index $$N_{PRB}^{start}$$

corresponding to the target PUCCH resource, the comb index m corresponding to the REs occupied by the target PUCCH resource in the PRBs of the target PRB-number, or the target PRB-number $N_{RB}$.

For example, the terminal device may determine the target comb interval according to the target PRB-number $N_{RB}$. For the manner of determination, reference can be made to related elaborations in the embodiment II.

For another example, the terminal device may determine, according to the target PRB-number $N_{RB}$, an RE number occupied by PUCCH transmission. For instance, if $N_{RB}\le 12$, PUCCH transmission occupies 12 REs in a PRB resource set. If $N_{RB}>12$, PUCCH transmission occupies $N_{RB}$ REs in a PRB resource set, and $N_{RB}$ is a multiple of 6.

In embodiments of the disclosure, the network device can implement multi-UE frequency division multiplexing by indicating different comb indexes m to different terminal devices, and there will be no occurrence of resource collision. For example, the network device may implement multi-UE frequency division multiplexing based on different comb indexes when the greatest common divisor of comb intervals for different terminal devices is greater than 1.

For example, for multiplexing of UEs with the same comb interval, the network device may implement multi-UE frequency division multiplexing by configuring different comb indexes for the UEs.

Taking frequency division multiplexing of UE-1 and UE-2 as an example for illustration, a PUCCH resource configuration indicated to UE-1 by the network device is:

$$N_{PRB}^{start} = 0,\ N_{RB} = 12,$$

and m=0; and a PUCCH resource configuration indicated to UE-2 by the network device is:

$$N_{PRB}^{start} = 0,$$

$N_{RB}$=12, and m=6. In this case, UE-1 adopts an interlaced mapping pattern of comb-12 in 12 PRBs (RB #0~RB #11), and UE-2 also adopts an interlaced mapping pattern of comb-12 in 12 PRBs (RB #0~RB #11).

An index of an RE occupied by PUCCH transmission of a UE may be expressed as:

$$N_{PRB}^{start}+(i*M+m)\text{mod}+N_{SC}^{RB},$$

where 0≤i≤$N_{RE}$.

$$N_{SC}^{RB}$$

represents the number of subcarriers in an RB, and the value of $$N_{SC}^{RB}$$

may be, for example, 12.

By substituting the PUCCH resource configuration configured for UE-1 by the network device into the above formula, it can be obtained that an index of an RE occupied by PUCCH transmission of UE-1 is:

$$0+(i*12+0)\text{mod}\,N_{SC}^{RB},$$

where 0≤i≤12. By substituting the PUCCH resource configuration configured for UE-2 by the network device into the above formula, it can be obtained that an index of an RE occupied by PUCCH transmission of UE-2 is:

$$0+(i^{*}12+6)\text{mod}N_{SC}^{RB},$$

where 0≤i≤12.

Figure 12:
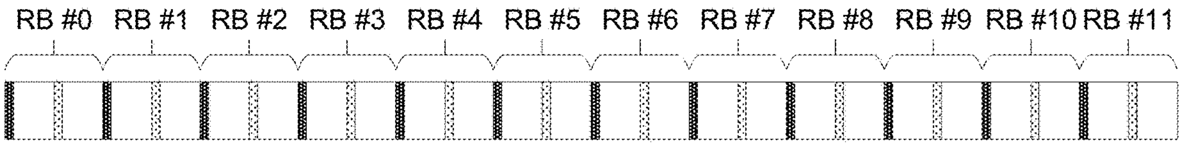
FIG. 12 is a schematic diagram illustrating frequency division multiplexing of 2 UEs with the same comb interval.

In other words, PUCCH transmission of UE-1 occupies RE 0 in each of the 12 PRBs, and PUCCH transmission of UE-2 occupies RE 6 in each of the 12 PRBs. Therefore, even though UE-1 and UE-2 use the same PRB resource set, the network device can still avoid resource collision between UEs by configuring different comb indexes. FIG. 12 is a schematic diagram illustrating a PUCCH resource corresponding to each of PUCCH transmission of UE-1 and PUCCH transmission of UE-2.

For another example, if comb intervals for UEs are different, but the greatest common divisor of the comb intervals for the UEs is greater than 1, the network device may still implement multi-UE frequency division multiplexing by configuring different comb indexes.

Taking frequency division multiplexing of UE-1 and UE-2 as an example for illustration, a PUCCH resource configuration indicated to UE-1 by the network device is:

$$N_{PRB}^{start}=0,$$

$N_{RB}$=4, and m=0; and a PUCCH resource configuration indicated to UE-2 by the network device is:

$$N_{PRB}^{start}=0,$$

$N_{RB}$=4, and m=1. In this case, UE-1 adopts an interlaced mapping pattern of comb-4 in 4 PRBs (RB #0~RB #3), and UE-2 adopts an interlaced mapping pattern of comb-6 in 6 PRBs (RB #0~RB #5).

An index of an RE occupied by PUCCH transmission of a UE may be expressed as:

$$N_{PRB}^{start}+(i^{*}M+m)\text{mod}N_{SC}^{RB},$$

where 0≤i≤$N_{RE}$.

$$N_{SC}^{RB}$$

represents the number of subcarriers in an RB, and the value of $$N_{SC}^{RB}$$

may be, for example, 12.

By substituting the PUCCH resource configuration configured for UE-1 by the network device into the above formula, it can be obtained that an index of an RE occupied by PUCCH transmission of UE-1 is:

$$0+(i^{*}4+0)\text{mod}N_{SC}^{RB},$$

where 0≤i≤12. By substituting the PUCCH resource configuration configured for UE-2 by the network device into the above formula, it can be obtained that an index of an RE occupied by PUCCH transmission of UE-2 is:

$$0+(i^{*}6+1)\text{mod}N_{SC}^{RB},$$

where 0≤i≤12.

Figure 13:
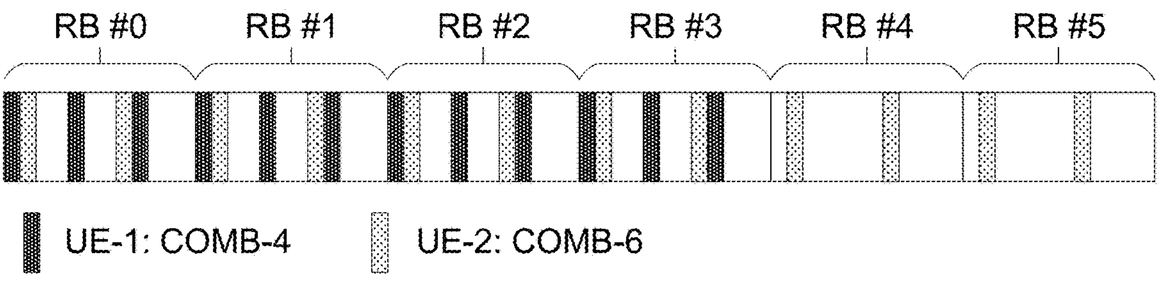
FIG. 13 is a schematic diagram illustrating frequency division multiplexing of 2 UEs with different comb intervals.

FIG. 13 is a schematic diagram illustrating a PUCCH resource corresponding to each of PUCCH transmission of UE-1 and PUCCH transmission of UE-2. As can be seen from FIG. 13, even though UE-1 and UE-2 use the same PRB resource set, the network device can still avoid resource collision between UEs by configuring different comb indexes.

Further, if there is UE-3, and a PUCCH resource configuration indicated to UE-3 by the network device is:

$$N_{PRB}^{start}=4,$$

$N_{RB}$=2, and m=0, based on the above formula, it can be obtained that an index of an RE occupied by PUCCH transmission of UE-3 is:

$$4+(i^{*}2+0)\bmod N_{SC}^{RB},$$

where 0≤i≤12.

Figure 14:
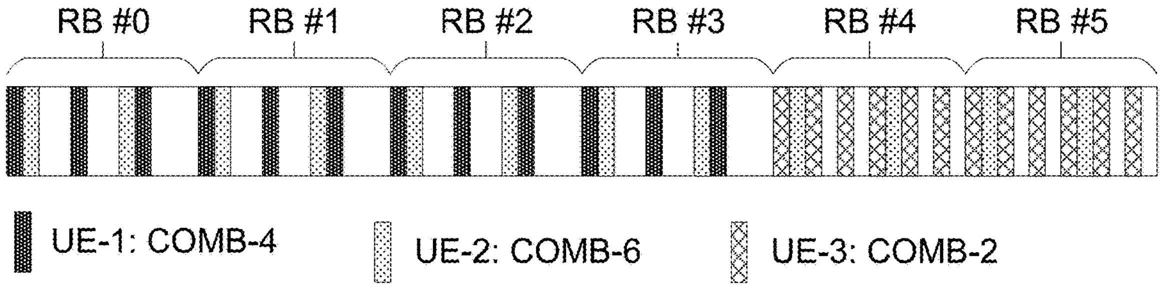
FIG. 14 is a schematic diagram illustrating frequency division multiplexing of 3 UEs with different comb intervals.

FIG. 14 is a schematic diagram illustrating a PUCCH resource corresponding to each of PUCCH transmission of UE-1, PUCCH transmission of UE-2, and PUCCH transmission of UE-3. As can be seen from FIG. 14, even though UE-1, UE-2, and UE-3 use the same PRB resource set, the network device can still implement multi-UE frequency division multiplexing by configuring at least one of: different comb indexes m, different $$N_{PRB}^{start},$$

or different $N_{RB}$.

Therefore, in embodiments of the disclosure, by configuring different start PRB indexes $$N_{PRB}^{start},$$

different comb indexes m, or different PRB numbers $N_{RB}$, the network device can implement frequency division multiplexing of different terminal devices on the same PRB resource set, thereby improving spectral efficiency.

As can be seen from embodiment IV, by means of sub-PRB interlaced mapping, it is possible to realize multi-UE frequency division multiplexing, for example, to realize flexible multiplexing of UEs with different PRB-numbers in frequency domain.

It should be noted that, embodiment I to embodiment IV described above may be implemented separately or may be combined, and embodiments of the disclosure are not limited in this regard.

Based on the foregoing embodiments, the terminal device can determine the target PRB-number used for PUCCH transmission, and then determine an interlaced mapping pattern used for the target PRB-number based PUCCH transmission, that is, the comb interval used for PUCCH transmission. In initial access, the terminal device can also determine the start PRB index corresponding to PUCCH transmission, the comb index for PUCCH transmission in PRBs of the target PRB-number, and the initial CS index used for PUCCH transmission. Alternatively, after entering the connected mode, the terminal device can determine, based on an indication of the network device, the target PRB-number used for PUCCH transmission, the start PRB index corresponding to PUCCH transmission, and the comb index for PUCCH transmission in PRBs of the target PRB-number, etc. By performing PUCCH transmission by means of sub-PRB interlaced mapping, it is beneficial to realizing multi-UE frequency division multiplexing, thereby improving spectral efficiency. In addition, by implementing PUCCH transmission on multiple PRBs, it is conducive to improving coverage performance of UL transmission.

The method embodiments of the disclosure are described in detail above with reference to FIG. 2 to FIG. 14, and the apparatus embodiments of the disclosure will be described in detail below with reference to FIG. 15 to FIG. 19. It should be understood that, the apparatus embodiments and the method embodiments correspond to each other, and for similar content, reference can be made to the method embodiments.

Figure 15:
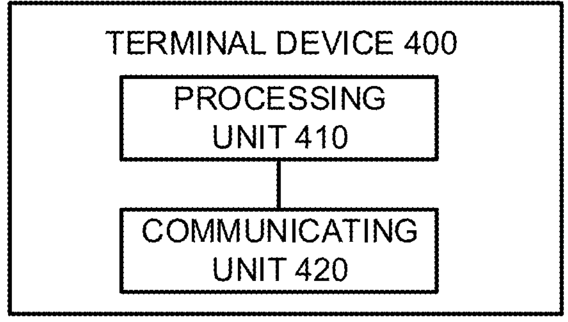
FIG. 15 is a schematic block diagram of a terminal device provided in embodiments of the disclosure.

FIG. 15 is a schematic block diagram of a terminal device 400 according to embodiments of the disclosure. As illustrated in FIG. 15, the terminal device 400 includes a processing unit 410 and a communicating unit 420. The processing unit 410 is configured to determine a PUCCH resource corresponding to a PUCCH, where the PUCCH resource includes at least one RE in each of PRBs of a target PRB-number, and the target PRB-number is a positive integer greater than or equal to 1. The communicating unit 420 is configured to transmit the PUCCH on the PUCCH resource.

In some embodiments of the disclosure, the processing unit 410 is further configured to determine the target PRB-number according to a preset rule and/or indication information from a network device.

In some embodiments of the disclosure, the processing unit 410 is further configured to determine a first PRB-number according to the preset rule, and determine the first PRB-number as the target PRB-number.

In some embodiments of the disclosure, the indication information indicates a PRB number used by the terminal device in a non-connected state for PUCCH transmission.

In some embodiments of the disclosure, the indication information is sent via a system message.

In some embodiments of the disclosure, the PRB number indicated by the indication information is determined by the network device according to a first candidate PRB-number set, the first candidate PRB-number set comprises at least one candidate PRB-number, each of the at least one candidate PRB-number does not exceed a first PRB-number, and the first PRB-number is a PRB number determined according to the preset rule.

In some embodiments of the disclosure, a granularity of the candidate PRB-number in the first candidate PRB-number set is greater than or equal to one PRB.

In some embodiments of the disclosure, PRB-number differences between the candidate PRB-numbers in the first candidate PRB-number set are unequal.

In some embodiments of the disclosure, the indication information indicates a PRB number used by the terminal device in a connected state for PUCCH transmission.

In some embodiments of the disclosure, the PRB number indicated by the indication information is determined by the network device according to a second candidate PRB-number set, the second candidate PRB-number set comprises at least one candidate PRB-number, each of the at least one candidate PRB-number does not exceed a second PRB-number, and the second PRB-number is a maximum PRB-number supported by PUCCH transmission reported by the terminal device to the network device.

In some embodiments of the disclosure, the processing unit 410 is further configured to determine the second PRB-number according to a hardware condition of the terminal device, where the hardware condition includes at least one of a maximum terminal conducted power or a maximum terminal EIRP supported by the terminal device.

In some embodiments of the disclosure, a granularity of the candidate PRB-number in the second candidate PRB-number set is greater than or equal to one PRB.

In some embodiments of the disclosure, PRB-number differences between the candidate PRB-numbers in the second candidate PRB-number set are unequal or equal.

In some embodiments of the disclosure, the processing unit 410 is further configured to determine, according to the target PRB-number $N_{RB}$, a target comb interval M used for transmitting the PUCCH, wherein the target comb interval M represents an RE number between adjacent REs in the target PUCCH resource.

In some embodiments of the disclosure, the processing unit 410 is further configured to determine $N_{RB}$ REs as the target comb interval if $N_{RB} \leq 12$, or determine 12 REs as the target comb interval if $N_{RB} > 12$.

In some embodiments of the disclosure, the target PUCCH resource includes 12 REs in the $N_{RB}$ PRBs if $N_{RB} \leq 12$, or the target PUCCH resource includes $N_{RB}$ REs if $N_{RB} > 12$.

In some embodiments of the disclosure, if $N_{RB} \leq 12$ and 12 is divisible by $N_{RB}$, an RE number in each PRB in the target PUCCH resource is the same, and an interval between adjacent REs is $N_{RB}$ REs; or if $N_{RB} \leq 12$ and 12 is not divisible by $N_{RB}$, the RE number in each PRB in the target PUCCH resource is different, and the interval between adjacent REs is $N_{RB}$ REs; or if $N_{RB} > 12$, the RE number in each PRB in the target PUCCH resource is 1, and $N_{RB}$ is a multiple of 6.

In some embodiments of the disclosure, the processing unit 410 is further configured to determine at least one of a start PRB index corresponding to the target PUCCH resource, a comb index corresponding to REs occupied by the target PUCCH resource in the PRBs of the target PRB-number, or an initial CS index used for code division multiplexing on the target PUCCH resource.

In some embodiments of the disclosure, the processing unit 410 is further configured to determine according to first information, by the terminal device, at least one of the start PRB index corresponding to the target PUCCH resource, the comb index corresponding to the REs occupied by the target PUCCH resource in the PRBs of the target PRB-number, or the initial CS index used for code division multiplexing on the target PUCCH resource. The first information includes at least one of: a target comb interval M used for PUCCH transmission, where the target comb interval M represents an RE number between adjacent REs in the target PUCCH resource; the number $N_{cs}$ of initial CS indexes in an initial CS index set; or the number K of PUCCH resources in a PUCCH resource set for initial access.

In some embodiments of the disclosure, the processing unit 410 is further configured to determine, by the terminal device, the start PRB index corresponding to the target PUCCH resource according to at least one of a PRB offset $$RB_{BWP}^{offset}$$

in an initial UL BWP, a PRB number $$N_{BWP}^{size}$$

in the initial UL BWP, or the target PRB-number $N_{RB}$, in response to determining, according to the target comb interval M and the number $N_{cs}$ of initial CS indexes in the initial CS index set, that REs in the PRBs of the target PRB-number can support the number K of PUCCH resources.

In some embodiments of the disclosure, determining, according to the target comb interval M and the number $N_{cs}$ of initial CS indexes in the initial CS index set, that the REs in the PRBs of the target PRB-number can support the number K of PUCCH resources includes: $M*N_{cs} \geq K$.

In some embodiments of the disclosure, the processing unit 410 is further configured to determine that the start PRB index corresponding to the target PUCCH resource in a 1st frequency-hopping unit is $$N_{RB}{}^{*}RB_{BWP}^{offset},$$

and determine that the start PRB index corresponding to the target PUCCH resource in a 2nd frequency-hopping unit is $$N_{BWP}^{size}-1-N_{RB}*RB_{BWP}^{offset}.$$

In some embodiments of the disclosure, the processing unit 410 is further configured to determine the start PRB index corresponding to the target PUCCH resource according to at least one of a resource index $r_{PUCCH}$ corresponding to PUCCH transmission, a PRB offset $$RB_{BWP}^{offset}$$

in an initial UL BWP, a PRB number $$N_{BWP}^{size}$$

in the initial UL BWP, or the target PRB-number $N_{RB}$, in response to determining, according to the target comb interval M and the number $N_{cs}$ of initial CS indexes in the initial CS index set, that REs in the PRBs of the target PRB-number cannot support the number K of PUCCH resources.

In some embodiments of the disclosure, determining, according to the target comb interval M and the number $N_{cs}$ of initial CS indexes in the initial CS index set, that the REs in the PRBs of the target PRB-number cannot support the number K of PUCCH resources includes: $M*N_{cs} < K$.

In some embodiments of the disclosure, the processing unit 410 is further configured to: if $\lfloor r_{PUCCH}/8 \rfloor = 0$, determine that the start PRB index corresponding to the target PUCCH resource in a 1st frequency-hopping unit is $$N_{RB}{}^{*}\left(RB_{BWP}^{offset}+\lfloor r_{PUCCH}/(M^{*}N_{cs})\rfloor\right),$$

and determine that the start PRB index corresponding to the target PUCCH resource in a 2nd frequency-hopping unit is $$N_{BWP}^{size}-1-N_{RB}{}^{*}\left(RB_{BWP}^{offset}+\lfloor r_{PUCCH}/(M^{*}N_{cs})\rfloor\right);$$

or if $\lfloor r_{PUCCH}/8 \rfloor = 1$, determine that the start PRB index corresponding to the target PUCCH resource in the 1st frequency-hopping unit is $$N_{BWP}^{size}-1-N_{RB}{}^{*}\left(RB_{BWP}^{offset}+\lfloor (r_{PUCCH}-8)/(M^{*}N_{cs})\rfloor\right),$$

and determine that the start PRB index corresponding to the target PUCCH resource in the $2^{nd}$ frequency-hopping unit is $$N_{RB}{}^{*}\left(RB_{BWP}^{offset}+\lfloor (r_{PUCCH}-8)/(M^{*}N_{cs})\rfloor\right),$$

where $\lfloor\ \rfloor$ represents floor.

In some embodiments of the disclosure, $r_{PUCCH}$ is determined according to the following formula:

$$r_{PUCCH}=\left\lfloor \frac{2\cdot n_{CCE,0}}{N_{CCE}}\right\rfloor+2\cdot\Delta_{PRI}$$

$N_{CCE}$ represents the number of CCEs in a CORESET on which downlink scheduling signaling received by the terminal device is located, $n_{CCE,0}$ represents an index of the $1^{st}$ CCE for the downlink scheduling signaling received by the terminal device, and $\Delta_{PRI}$ represents a value of a PUCCH resource indicator field in the downlink scheduling signaling.

In some embodiments of the disclosure, the processing unit 410 is further configured to determine the comb index corresponding to the REs occupied by the target PUCCH resource in the PRBs of the target PRB-number according to at least one of the resource index $r_{PUCCH}$ corresponding to PUCCH transmission, the target comb interval M, or the number $N_{cs}$ of initial CS indexes in the initial CS index set.

In some embodiments of the disclosure, the processing unit 410 is further configured to determine the comb index corresponding to the REs occupied by the target PUCCH resource in the PRBs of the target PRB-number according to the following formula:

$$m=(\lfloor r_{PUCCH}/N_{cs}\rfloor)\bmod M$$

m represents the comb index, $\lfloor\ \rfloor$ represents floor, and mod represents modulo.

In some embodiments of the disclosure, the processing unit 410 is further configured to determine the initial CS index used for code division multiplexing on the target PUCCH resource according to at least one of the resource index $r_{PUCCH}$ corresponding to PUCCH transmission or the number $N_{cs}$ of initial CS indexes in the initial CS index set.

In some embodiments of the disclosure, the processing unit 410 is further configured to determine the initial CS index used for code division multiplexing on the target PUCCH resource according to the following formula:

$$n_{cs}=r_{PUCCH}\bmod N_{cs}$$

$n_{CS}$ represents the initial CS index, and mod represents modulo.

In some embodiments of the disclosure, the target PUCCH resource is a common PUCCH resource for the terminal device in the non-connected state.

In some embodiments of the disclosure, the processing unit 410 is further configured to determine the target PUCCH resource according to first indication information sent by the network device, where the first indication information indicates at least one of the start PRB index corresponding to the target PUCCH resource, the comb index corresponding to REs occupied by the target PUCCH resource in the PRBs of the target PRB-number, or the target PRB-number.

In some embodiments of the disclosure, a format of the PUCCH is one of: PUCCH format 0, PUCCH format 1, or PUCCH format 4.

Optionally, in some embodiments, the communicating unit may be a communication interface or a transceiver, or an input/output interface of a communication chip or a system-on-chip (SOC). The processing unit may be one or more processors.

It should be understood that, the terminal device 400 according to embodiments of the disclosure may correspond to the terminal device in the method embodiments of the disclosure, and the foregoing and other operations and/or functions of various units in the terminal device 400 are respectively intended for implementing corresponding operations of the terminal device in the method 200 illustrated in FIG. 2 to FIG. 14, which will not be described again herein for the sake of brevity.

Figure 16:
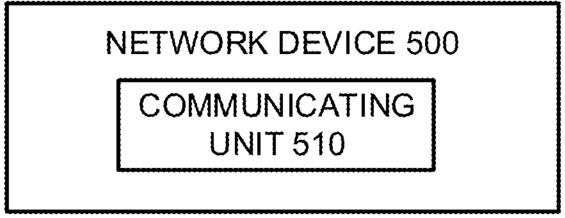
FIG. 16 is a schematic block diagram of a network device provided in embodiments of the disclosure.

FIG. 16 is a schematic block diagram of a network device according to embodiments of the disclosure. The network device 500 illustrated in FIG. 16 includes a communicating unit 510. The communicating unit 510 is configured to send indication information to a first terminal device, where the indication information is used for the first terminal device to determine a target PUCCH resource used for transmitting a PUCCH, the PUCCH resource includes at least one RE in each of PRBs of a target PRB-number, and the target PRB-number is a positive integer greater than or equal to 1.

In some embodiments of the disclosure, the indication information indicates a PRB number used by a terminal device in a non-connected state for PUCCH transmission.

In some embodiments of the disclosure, the indication information is sent via a system message.

In some embodiments of the disclosure, the PRB number indicated by the indication information is determined by the network device according to a first candidate PRB-number set, the first candidate PRB-number set comprises at least one candidate PRB-number, each of the at least one candidate PRB-number does not exceed a first PRB-number, and the first PRB-number is a PRB number determined according to a preset rule.

In some embodiments of the disclosure, a granularity of the candidate PRB-number in the first candidate PRB-number set is greater than or equal to one PRB.

In some embodiments of the disclosure, PRB-number differences between the candidate PRB-numbers in the first candidate PRB-number set are unequal.

In some embodiments of the disclosure, the first candidate PRB-number set is pre-configured at the network device.

In some embodiments of the disclosure, the indication information indicates a PRB number used by a terminal device in a connected state for PUCCH transmission.

In some embodiments of the disclosure, the PRB number indicated by the indication information is determined by the network device according to a second candidate PRB-number set, the second candidate PRB-number set comprises at least one candidate PRB-number, each of the at least one candidate PRB-number does not exceed a second PRB-number, and the second PRB-number is a maximum PRB-number supported by PUCCH transmission reported by the terminal device to the network device.

In some embodiments of the disclosure, the communicating unit 510 is further configured to receive the second PRB-number reported by the terminal device.

In some embodiments of the disclosure, the PRB number indicated by the indication information is determined by the network device according to a second candidate PRB-number set, the second candidate PRB-number set comprises at least one candidate PRB-number, each of the at least one candidate PRB-number does not exceed a first PRB-number, and the first PRB-number is a PRB number determined according to a preset rule.

In some embodiments of the disclosure, a granularity of the candidate PRB-number in the second candidate PRB-number set is greater than or equal to one PRB.

In some embodiments of the disclosure, PRB-number differences between the candidate PRB-numbers in the second candidate PRB-number set are unequal or equal.

In some embodiments of the disclosure, the network device further includes a processing unit. The processing unit is configured to determine, based on the second candidate PRB-number set, a PRB number used for PUCCH transmission according to a channel condition of the terminal device.

In some embodiments of the disclosure, the indication information includes first indication information, the first indication information indicates at least one of a start PRB index corresponding to the target PUCCH resource used by the first terminal device for PUCCH transmission, a comb index corresponding to REs occupied by the target PUCCH resource in the PRBs of the target PRB-number, or the target PRB-number.

In some embodiments of the disclosure, the communicating unit 510 is further configured to send second indication information to a second terminal device, where the second indication information indicates at least one of a start PRB index corresponding to the target PUCCH resource used by the second terminal device for PUCCH transmission, a comb index corresponding to REs occupied by the target PUCCH resource in the PRBs of the target PRB-number, or the target PRB-number. The at least one of the start PRB index, the comb index, or the target PRB-number indicated by the first indication information is different from the at least one of the start PRB index, the comb index, or the target PRB-number indicated by the second indication information.

In some embodiments of the disclosure, a format of the PUCCH is one of: PUCCH format 0, PUCCH format 1, or PUCCH format 4.

Optionally, in some embodiments, the communicating unit may be a communication interface or a transceiver, or an input/output interface of a communication chip or an SOC. The processing unit may be one or more processors.

It should be understood that, the network device 500 according to embodiments of the disclosure may correspond to the network device in the method embodiments of the disclosure, and the foregoing and other operations and/or functions of various units in the network device 500 are respectively intended for implementing corresponding operations of the network device in the method 200 illustrated in FIG. 2, which will not be described again herein for the sake of brevity.

Figure 17:
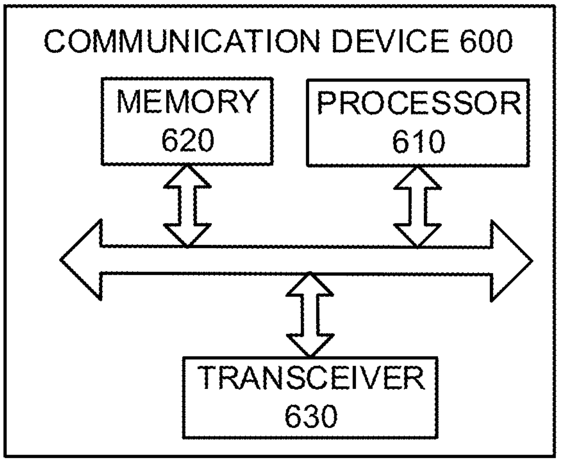
FIG. 17 is a schematic block diagram of a communication device provided in embodiments of the disclosure.

FIG. 17 is a schematic structural diagram of a communication device 600 provided in embodiments of the disclosure. The communication device 600 illustrated in FIG. 17 includes a processor 610. The processor 610 can invoke and execute computer programs stored in a memory, to implement the method in embodiments of the disclosure.

Optionally, as illustrated in FIG. 17, the communication device 600 may further include a memory 620, where the processor 610 can invoke and execute computer programs stored in the memory 620 to implement the method in embodiments of the disclosure.

The memory 620 may be a separate device independent of the processor 610, or may be integrated into the processor 610.

Optionally, as illustrated in FIG. 17, the communication device 600 may further include a transceiver 630. The processor 610 can control the transceiver 630 to communicate with other devices, and specifically, to send information or data to other devices or receive information or data sent by other devices.

The transceiver 630 may include a transmitter and a receiver. The transceiver 630 can further include an antenna, where one or more antennas may be provided.

Optionally, the communication device 600 may specifically be a network device in embodiments of the disclosure, and the communication device 600 may implement corresponding operations implemented by the network device in various methods in embodiments of the disclosure, which will not be described again herein for the sake of brevity.

Optionally, the communication device 600 may specifically be a mobile terminal/terminal device in embodiments of the disclosure, and the communication device 600 may implement corresponding operations implemented by the mobile terminal/terminal device in various methods in embodiments of the disclosure, which will not be described again herein for the sake of brevity.

Figure 18:
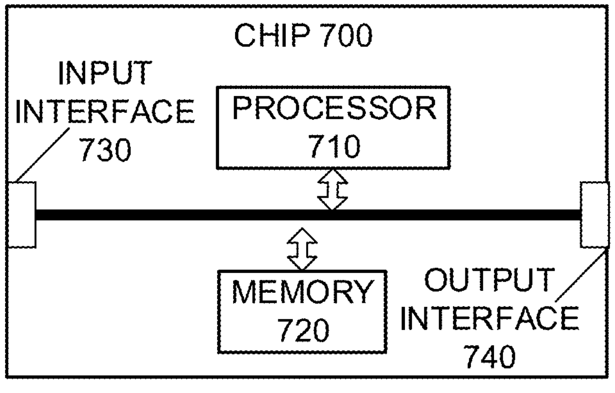
FIG. 18 is a schematic block diagram of a chip provided in embodiments of the disclosure.

FIG. 18 is a schematic structural diagram of a chip according to embodiments of the disclosure. The chip 700 illustrated in FIG. 18 includes a processor 710. The processor 710 can invoke and execute computer programs stored in a memory, so as to implement the method in embodiments of the disclosure.

Optionally, as illustrated in FIG. 18, the chip 700 may further include a memory 720. The processor 710 can invoke and execute computer programs stored in the memory 720, so as to implement the method in embodiments of the disclosure.

The memory 720 may be a separate device independent of the processor 710, or may be integrated into the processor 710.

Optionally, the chip 700 may further include an input interface 730. The processor 710 can control the input interface 730 to communicate with other devices or chips, and specifically, to obtain information or data sent by other devices or chips.

Optionally, the chip 700 may further include an output interface 740. The processor 710 can control the output interface 740 to communicate with other devices or chips, and specifically, to output information or data to other devices or chips.

Optionally, the chip may be applied to the network device in embodiments of the disclosure, and the chip may implement corresponding operations implemented by the network device in various methods in embodiments of the disclosure, which will not be described again herein for the sake of brevity.

Optionally, the chip may be applied to the mobile terminal/terminal device in embodiments of the disclosure, and the chip may implement corresponding operations implemented by the mobile terminal/terminal device in various methods in embodiments of the disclosure, which will not be described again herein for the sake of brevity.

Optionally, the chip in embodiments of the disclosure may also be an SOC.

Figure 19:
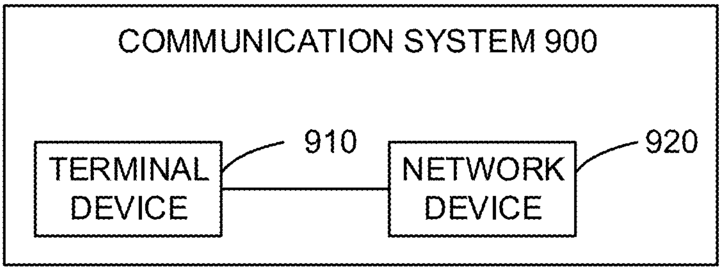
FIG. 19 is a schematic block diagram of a communication system provided in embodiments of the disclosure.

FIG. 19 is a schematic block diagram of a communication system 900 provided in embodiments of the disclosure. As illustrated in FIG. 19, the communication system 900 includes a terminal device 910 and a network device 920.

The terminal device 910 may be configured to implement corresponding functions implemented by the terminal device in the foregoing method, and the network device 920 may be configured to implement corresponding functions implemented by the network device in the foregoing method, which will not be described in detail again herein for the sake of brevity.

It should be understood that, the processor in embodiments of the disclosure may be an integrated circuit chip with signal processing capabilities. During implementation, each step of the foregoing method embodiments may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in embodiments of the disclosure can be implemented or executed. The general-purpose processor may be a microprocessor, or the processor may be any conventional processor or the like. The steps of the method disclosed in embodiments of the disclosure may be directly implemented by a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory in embodiments of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that, the memory of the systems and methods described in the disclosure is intended to include, but is not limited to, these and any other suitable types of memory.

It should be understood that, the memory above is intended for illustration rather than limitation. For example, the memory in embodiments of the disclosure may also be an SRAM, a DRAM, an SDRAM, a DDR SDRAM, an ESDRAM, an SLDRAM, a DR RAM, etc. In other words, the memory in embodiments of the disclosure is intended to include, but is not limited to, these and any other suitable types of memory.

Embodiments of the disclosure further provide a computer-readable storage medium. The computer-readable storage medium is configured to store computer programs.

Optionally, the computer-readable storage medium may be applied to the network device in embodiments of the disclosure, and the computer programs are operable with a computer to execute corresponding operations implemented by the network device in various methods in embodiments of the disclosure, which will not be described again herein for the sake of brevity.

Optionally, the computer-readable storage medium may be applied to a mobile terminal/terminal device in embodiments of the disclosure, and the computer programs are operable with a computer to execute corresponding operations implemented by the mobile terminal/terminal device in various methods in embodiments of the disclosure, which will not be described again herein for the sake of brevity.

Embodiments of the disclosure further provide a computer program product. The computer program product includes computer program instructions.

Optionally, the computer program product may be applied to the network device in embodiments of the disclosure, and the computer program instructions are operable with a computer to execute corresponding operations implemented by the network device in various methods in embodiments of the disclosure, which will not be described again herein for the sake of brevity.

Optionally, the computer program product may be applied to a mobile terminal/terminal device in embodiments of the disclosure, and the computer program instructions are operable with a computer to execute corresponding operations implemented by the mobile terminal/terminal device in various methods in embodiments of the disclosure, which will not be described again herein for the sake of brevity.

Embodiments of the disclosure further provide a computer program.

Optionally, the computer program may be applied to the network device in embodiments of the disclosure. The computer program, when executed by a computer, is operable to implement corresponding operations implemented by the network device in various methods in embodiments of the disclosure, which will not be described again herein for the sake of brevity.

Optionally, the computer program may be applied to a mobile terminal/terminal device in embodiments of the disclosure. The computer program, when executed by a computer, is operable to implement corresponding operations implemented by the mobile terminal/terminal device in various methods in embodiments of the disclosure, which will not be described again herein for the sake of brevity.

Those of ordinary skill in the art will appreciate that units and algorithmic operations of various examples described in connection with embodiments of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and brevity, in terms of the specific working processes of the foregoing systems, apparatuses, and units, reference can be made to the corresponding processes in the foregoing method embodiments, which will not be repeated herein.

It will be appreciated that the systems, apparatuses, and methods disclosed in embodiments of the disclosure may also be implemented in various other manners. For example, the above apparatus embodiments are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in various embodiments of the disclosure may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computer device, e.g., a personal computer, a server, a network device, etc., to execute some or all operations of the methods described in various embodiments of the disclosure. The above storage medium may include various kinds of media that can store program codes, such as a universal serial bus (USB) flash disk, a mobile hard drive, a ROM, a RAM, a magnetic disk, or an optical disk.

The foregoing elaborations are merely implementations of the disclosure, but are not intended to limit the protection scope of the disclosure. Any variation or replacement easily thought of by those skilled in the art within the technical scope disclosed in the disclosure shall belong to the protection scope of the disclosure. Therefore, the protection scope of the disclosure shall be subject to the protection scope of the claims.

I claim:

1. A wireless communication method, comprising:

determining, by a terminal device, a target physical uplink control channel (PUCCH) resource corresponding to a PUCCH, wherein the PUCCH resource comprises at least one resource element (RE) in each of physical resource blocks (PRBs) of a target PRB-number, and the target PRB-number is a positive integer greater than or equal to 1; and transmitting, by the terminal device, the PUCCH on the target PUCCH resource;

wherein determining, by the terminal device, the target PUCCH resource corresponding to the PUCCH comprises:

determining, by the terminal device, at least one of a start PRB index corresponding to the target PUCCH resource, a comb index corresponding to REs occupied by the target PUCCH resource in the PRBs of the target PRB-number, or an initial cyclic shift (CS) index used for code division multiplexing on the target PUCCH resource.

2. The method of claim 1, wherein determining, by the terminal device, the target PUCCH resource corresponding to the PUCCH comprises:

determining, by the terminal device, the target PRB-number according to a preset rule and/or indication information from a network device.

3. The method of claim 2, wherein the indication information indicates a PRB number used by the terminal device in a non-connected state for PUCCH transmission.

4. The method of claim 3, wherein the indication information is sent via a system message.

5. The method of claim 3, wherein the PRB number indicated by the indication information is determined by the network device according to a first candidate PRB-number set, the first candidate PRB-number set comprises at least one candidate PRB-number, each of the at least one candidate PRB-number does not exceed a first PRB-number, and the first PRB-number is a PRB number determined according to the preset rule.

6. The method of claim 2, wherein the indication information indicates a PRB number used by the terminal device in a connected state for PUCCH transmission.

7. The method of claim 1, wherein determining, by the terminal device, at least one of the start PRB index corresponding to the target PUCCH resource, the comb index corresponding to the REs occupied by the target PUCCH resource in the PRBs of the target PRB-number, or the initial CS index used for code division multiplexing on the target PUCCH resource comprises:

determining according to first information, by the terminal device, at least one of the start PRB index corresponding to the target PUCCH resource, the comb index corresponding to the REs occupied by the target PUCCH resource in the PRBs of the target PRB-number, or the initial CS index used for code division multiplexing on the target PUCCH resource;

wherein the first information comprises at least one of:

a target comb interval M used for PUCCH transmission, wherein the target comb interval M represents an RE number between adjacent REs in the target PUCCH resource;

the number $N_{cs}$ of initial CS indexes in an initial CS index set; or the number K of PUCCH resources in a PUCCH resource set for initial access.

8. The method of claim 7, wherein determining, by the terminal device, at least one of the start PRB index corresponding to the target PUCCH resource, the comb index corresponding to the REs occupied by the target PUCCH resource in the PRBs of the target PRB-number, or the initial CS index used for code division multiplexing on the target PUCCH resource comprises:

determining, by the terminal device, the start PRB index corresponding to the target PUCCH resource according to at least one of a resource index $r_{PUCCH}$ corresponding to PUCCH transmission, a PRB offset $$RB_{BWP}^{offset}$$

in an initial UL BWP, a PRB number $$N_{BWP}^{size}$$

in the initial UL BWP, or the target PRB-number $N_{RB}$, in response to determining, according to the target comb interval M and the number $N_{cs}$ of initial CS indexes in the initial CS index set, that REs in the PRBs of the target PRB-number cannot support the number K of PUCCH resources.

9. The method of claim 8, wherein determining, by the terminal device, the start PRB index corresponding to the target PUCCH resource according to at least one of the resource index $r_{PUCCH}$ corresponding to PUCCH transmission, the PRB offset $$RB_{BWP}^{offset}$$

in the initial UL BWP, the number $$N_{BWP}^{size}$$

of the PRBs in the initial UL BWP, or the target PRB-number $N_{RB}$ comprises:

when $\lfloor r_{PUCCH}/8 \rfloor = 0$, determining that the start PRB index corresponding to the target PUCCH resource in a $1^{st}$ frequency-hopping unit is $$N_{RB} * \left(RB_{BWP}^{offset} + \lfloor r_{PUCCH}/(M * N_{cs}) \rfloor\right);$$

or when $\lfloor r_{PUCCH}/8 \rfloor = 1$, determining that the start PRB index corresponding to the target PUCCH resource in the $2^{nd}$ frequency-hopping unit is $$N_{RB} * \left(RB_{BWP}^{offset} + \lfloor (r_{PUCCH} - 8)/(M * N_{cs}) \rfloor\right);$$

wherein $\lfloor\ \rfloor$ represents floor.

10. A wireless communication method, comprising:

sending, by a network device, indication information to a first terminal device, wherein the indication information is used for the first terminal device to determine a target physical uplink control channel (PUCCH) resource used for transmitting a PUCCH, the PUCCH resource comprises at least one resource element (RE) in each of physical resource blocks (PRBs) of a target PRB-number, and the target PRB-number is a positive integer greater than or equal to 1;

wherein the indication information comprises first indication information, the first indication information indicates at least one of a start PRB index corresponding to the target PUCCH resource used by the first terminal device for PUCCH transmission, a comb index corresponding to REs occupied by the target PUCCH resource in the PRBs of the target PRB-number, or the target PRB-number.

11. The method of claim 10, wherein the indication information indicates a PRB number used by a terminal device in a non-connected state for PUCCH transmission.

12. The method of claim 11, wherein the indication information is sent via a system message.

13. The method of claim 11, wherein the PRB number indicated by the indication information is determined by the network device according to a first candidate PRB-number set, the first candidate PRB-number set comprises at least one candidate PRB-number, each of the at least one candidate PRB-number does not exceed a first PRB-number, and the first PRB-number is a PRB number determined according to a preset rule.

14. The method of claim 10, wherein the indication information indicates a PRB number used by a terminal device in a connected state for PUCCH transmission.

15. A terminal device, comprising:

a transceiver;

a memory configured to store computer programs; and a processor configured to invoke and execute the computer programs stored in the memory to:

determine a target physical uplink control channel (PUCCH) resource corresponding to a PUCCH, wherein the PUCCH resource comprises at least one resource element (RE) in each of physical resource blocks (PRBs) of a target PRB-number, and the target PRB-number is a positive integer greater than or equal to 1; and cause the transceiver to transmit the PUCCH on the target PUCCH resource;

wherein the processor configured to determine the target PUCCH resource corresponding to the PUCCH is configured to:

determine at least one of a start PRB index corresponding to the target PUCCH resource, a comb index corresponding to REs occupied by the target PUCCH resource in the PRBs of the target PRB-number, or an initial cyclic shift (CS) index used for code division multiplexing on the target PUCCH resource.

16. The terminal device of claim 15, wherein the processor is further configured to:

determine the target PRB-number according to a preset rule and/or indication information from a network device.

17. The terminal device of claim 16, wherein the indication information indicates a PRB number used by the terminal device in a non-connected state for PUCCH transmission.

18. The terminal device of claim 17, wherein the indication information is sent via a system message.

* * * * *